(12) United States Patent  
Smith et al.

(10) Patent No.: US 10,843,330 B2  
(45) Date of Patent: Nov. 24, 2020

(54) RESISTANCE-BASED JOINT CONSTRAINT FOR A MASTER ROBOTIC SYSTEM

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 370 days.

(21) Appl. No.: 15/835,280

(22) Filed: Dec. 7, 2017

(65) Prior Publication Data

US 2019/0176320 A1    Jun. 13, 2019

(51) Int. Cl.
*G05B 19/04* (2006.01)
*G05B 19/18* (2006.01)
(Continued)

(52) U.S. Cl.
CPC .............. *B25J 3/04* (2013.01); *B25J 9/1689* (2013.01); *B25J 13/025* (2013.01);
(Continued)

(58) Field of Classification Search
CPC .... B25J 13/025; B25J 13/085; B25J 19/0004; B25J 3/04; B25J 9/1682; B25J 9/1689;
(Continued)

(56) References Cited

U.S. PATENT DOCUMENTS 1,880,138 A    9/1932    Franz
2,850,189 A    9/1958    Leroy
(Continued)

FOREIGN PATENT DOCUMENTS

CN    101214653 A    7/2008
CN    103610524 A    3/2014
(Continued)

OTHER PUBLICATIONS

Aghili et al., Sensing the torque in a robot's joints, www.memagazine.org/backissues/september98/features/torque.html, 1998, pp. 1-9, The American Society of Mechanical Engineers.
(Continued)

*Primary Examiner* — Harry Y Oh

(57) ABSTRACT

A master robotic system for translating a force at a slave robotic system to the master robotic system comprises a plurality of master brake joints rotatably coupling a plurality of robotic links. Each master brake joint corresponds to a respective slave joint of a slave robotic system. Each master brake joint comprises a first braking component (e.g., sheet disk(s)) coupled to a first robotic link and a second braking component (e.g., sheet disk(s)) coupled to a second robotic link, and an actuator operable to act upon the first braking component and the second braking component, to generate a braking force between the first braking component and the second braking component, in response to a control signal corresponding to a sensed force sensed by the slave robotic system. The actuator can comprise a bi-directional actuator, or a cam, piezoelectric, dielectric, or hydraulic actuator, each having minimal power requirements to maximize the braking force of the master brake joint.

40 Claims, 9 Drawing Sheets

(51) Int. Cl.

| | | |
|---|---|---|
| *B25J 3/04* | (2006.01) | |
| *B25J 9/16* | (2006.01) | |
| *F16D 65/18* | (2006.01) | |
| *F16D 55/00* | (2006.01) | |
| *F16D 55/31* | (2006.01) | |
| *B25J 13/02* | (2006.01) | |
| *B25J 19/00* | (2006.01) | |
| *G06F 3/01* | (2006.01) | |
| *B25J 13/08* | (2006.01) | |
| *F16D 125/66* | (2012.01) | |
| *F16D 121/24* | (2012.01) | |

(52) U.S. Cl.
CPC .......... *B25J 19/0004* (2013.01); *F16D 55/00* (2013.01); *F16D 55/31* (2013.01); *F16D 65/18* (2013.01); *B25J 9/1682* (2013.01); *B25J 13/085* (2013.01); *F16D 2121/24* (2013.01); *F16D 2125/66* (2013.01); *G06F 3/011* (2013.01)

(58) Field of Classification Search
CPC .. F16D 2121/24; F16D 2125/66; F16D 55/00; F16D 55/31; F16D 65/18; G06F 3/011
See application file for complete search history.

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,398,110 A | 8/1983 | Flinchbaugh et al. |
| 4,483,407 A | 11/1984 | Iwamoto et al. |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 7,168,748 B2 | 1/2007 | Townsend et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |

(56) References Cited

U.S. PATENT DOCUMENTS

| | | |
|---|---|---|
| 8,870,967 B2 | 10/2014 | Herr et al. |
| 8,881,616 B2 | 11/2014 | Dize et al. |
| 8,888,864 B2 | 11/2014 | Iverson et al. |
| 8,892,258 B2 | 11/2014 | Jacobsen et al. |
| 8,920,517 B2 | 12/2014 | Smith et al. |
| 8,942,846 B2 * | 1/2015 | Jacobsen et al. |
| 8,977,388 B2 | 3/2015 | Jacobsen et al. |
| 8,977,398 B2 | 3/2015 | Jacobsen et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,533,411 B2 | 1/2017 | Jacobsen et al. |
| 9,616,580 B2 | 4/2017 | Smith et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 10,028,844 B2 | 7/2018 | Cheng et al. |
| 10,071,485 B2 * | 11/2018 | Schiele et al. |
| 10,216,177 B2 | 2/2019 | Gildert et al. |
| 10,406,676 B2 | 9/2019 | Smith et al. |
| 10,512,583 B2 | 12/2019 | Smith |
| 10,533,542 B2 | 1/2020 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 * | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 * | 11/2013 | Laffranchi et al. |
| 2013/0331744 A1 | 12/2013 | Kamon |
| 2013/0333368 A1 | 12/2013 | Durfee et al. |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321342 A1 | 11/2015 | Smith et al. |
| 2016/0114482 A1 | 4/2016 | Lessing et al. |
| 2016/0153508 A1 | 6/2016 | Battlogg |
| 2016/0279788 A1 * | 9/2016 | Kanaoka |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2017/0050310 A1 * | 2/2017 | Kanaoka |
| 2018/0133905 A1 | 5/2018 | Smith et al. |
| 2018/0133906 A1 | 5/2018 | Smith et al. |
| 2018/0193999 A1 | 7/2018 | Jacobsen et al. |
| 2018/0194000 A1 | 7/2018 | Smith et al. |
| 2018/0290309 A1 | 10/2018 | Becker et al. |
| 2018/0298976 A1 | 10/2018 | Battlogg |
| 2019/0184576 A1 | 6/2019 | Smith et al. |
| 2020/0001450 A1 | 1/2020 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |

(56) References Cited

FOREIGN PATENT DOCUMENTS

| | | |
|---|---|---|
| EP | 1721593 A1 | 11/2006 |
| EP | 2198810 A1 | 6/2010 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006007337 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014200853 A | 10/2014 |
| JP | 2015112649 A | 6/2015 |
| JP | 2015-212010 A | 11/2015 |
| JP | 2015-214019 A | 12/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and

(56) References Cited

OTHER PUBLICATIONS

Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filed, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3. PLOS One, San Francisco, California.

Siddharth et al., Design and Analysis of a 1-DOF Walking Mechanism, http://siddharthswaminathan.in/files/WalkingMechanism.pdf , Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.

Suleiman, Engineering an affordable exoskeleton, Phys.org, https://phys.org/news/2014-06-exoskeleton.html, Jun. 12, 2014, 5 pages, Science X Network.

Tmsuk, Rescue Robot "T-53" release Control Technologies to Control the Synchronous Operation of the Arm, http://robot.watch.

(56) References Cited

OTHER PUBLICATIONS impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

International Search Report for International Application No. PCT/US2019/068998 dated May 20, 2020, 15 pages.

International Search Report for International Application No. PCT/US2019/069004 dated Apr. 1, 2020, 15 pages.

International Search Report for International Application No. PCT/US2019/069001 dated Apr. 30, 2020, 18 pages.

\* cited by examiner

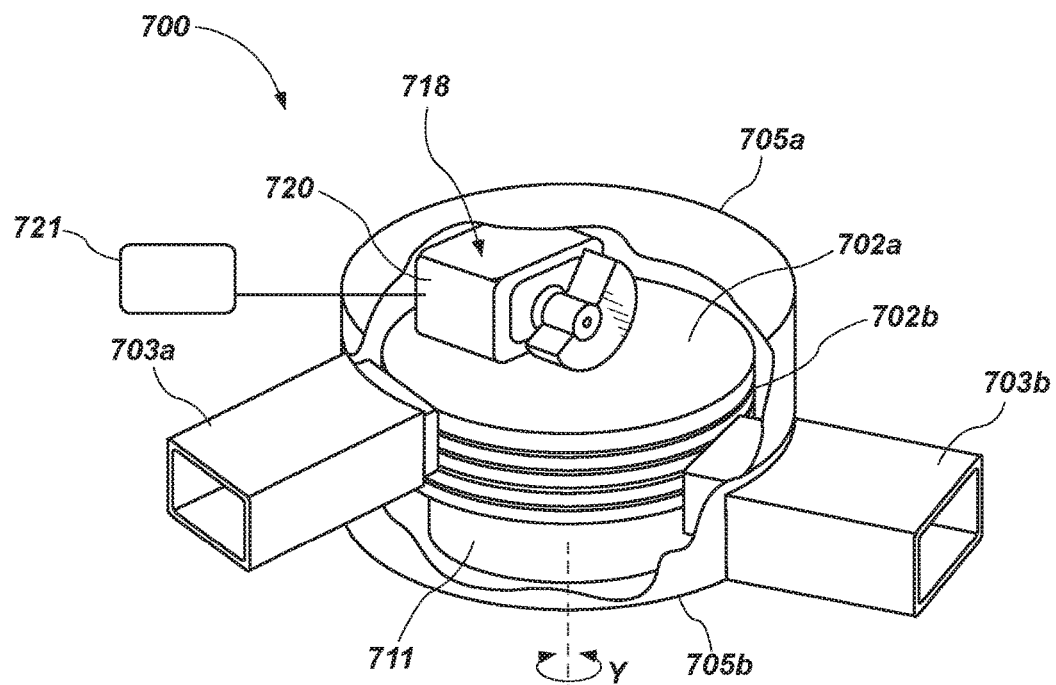
FIG. 7A
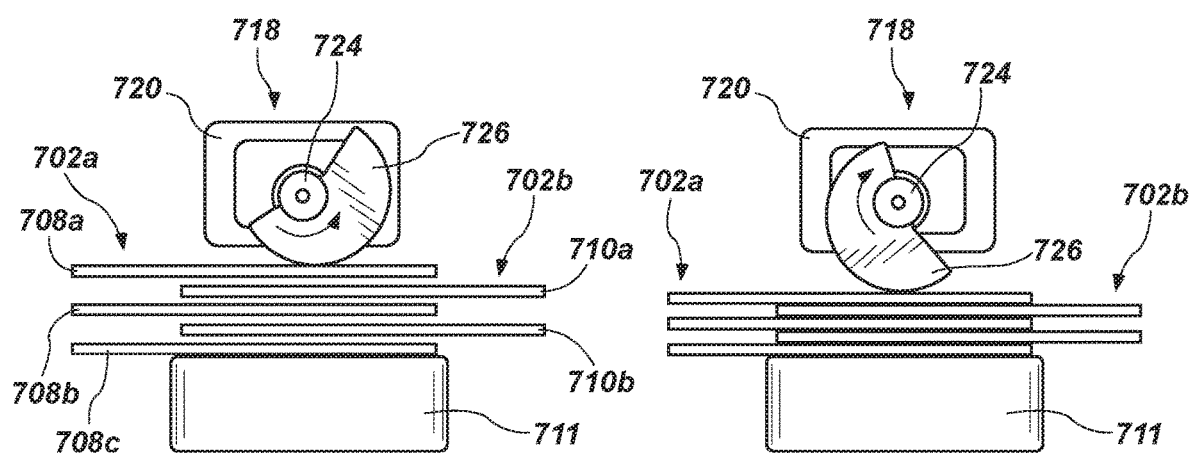
FIG. 7B
FIG. 7C

RESISTANCE-BASED JOINT CONSTRAINT FOR A MASTER ROBOTIC SYSTEM

BACKGROUND

Utilizing a master control system in remote operation applications poses various challenges. For instance, when a human operator remotely controls a slave system (e.g., non-humanoid robot, humanoid robot, hand robot, virtual avatar/robot, etc.) with a master control system (e.g., exoskeleton, virtual reality controls, etc.), it can be required to account for kinematic mapping of a non-anthropomorphic kinematic arrangement of the master control system onto a human kinematic configuration. Moreover, when the slave system experiences various forces due to pushing a mass or bumping into an object, for instance, it is often desirable for the human operator to be able to perceive these forces to better control the slave system for a particular task. Thus, robotic systems can be configured to utilize what has been termed "force-reflection" where forces experienced by the slave are essentially "felt" by the user through the master control device.

Prior solutions used to achieve force reflection involve incorporating large pneumatic or hydraulic actuators into a master control device of a robotic system that are controlled to provide a force reflection value to the human operator via joints of the master control device, which in some cases, for instance, can comprise an upper robotic exoskeleton worn by the operator. However, such solutions have various drawbacks, such as cost, complexity, weight, poor controllability, etc.

BRIEF SUMMARY OF THE INVENTION

Disclosed herein is a master robotic system for translating a force at a slave robotic system to the master robotic system. The master robotic system comprises a plurality of robotic links and a plurality of master brake joints rotatably coupling the plurality of robotic links. Each master brake joint corresponds to a respective slave joint of a slave robotic system controllable by the master robotic system. Each master brake joint comprises a first braking component coupled to a first robotic link of the plurality of robotic links, and a second braking component coupled to a second robotic link of the plurality of robotic links, wherein the second braking component is rotatable relative to the first braking component. Each master brake joint further comprises an actuator operable to act upon the first braking component and the second braking component, to generate a braking force between the first braking component and the second braking component, in response to a control signal corresponding to a sensed force sensed by the slave robotic system.

In some examples, the braking force is variable. In some examples, the braking force has only a first magnitude, or in other words, is non-variable. In some examples, a magnitude of the braking force is variable, and a proportionality of the braking force to the sensed force is dynamically controllable.

In some examples, the actuator comprises a bi-directional actuator having a motor and an actuation member, wherein the actuation member is rotatable by the motor to apply a bi-directional force to at least one of the first braking component or the second braking component to generate the braking force.

In some examples, the actuator comprises one of: a dielectric actuator operable to generate the braking force, wherein the dielectric actuator comprises a dielectric material disposed between a pair of electrodes coupled to a voltage source; a piezoelectric actuator operable to generate the braking force, wherein the piezoelectric actuator comprises a stack of piezoelectric components configured to be coupled to a voltage source operable to displace the stack of piezoelectric components; or a fluid or hydraulic actuator operable to generate the braking force, wherein the fluid or hydraulic actuator comprises an actuation component and at least one fluid piston fluidly coupled to the fluid or hydraulic actuation component, wherein the actuation component is positioned distally from the at least one fluid piston and is configured to actuate the at least one fluid piston to generate the braking force.

In some examples, the first braking component and the second braking component comprise an interleaved multi-disk configuration compressible to generate the braking force.

Disclosed herein is a force-reflective robotic system for translating a force of a slave robotic system to a master robotic system comprising a slave robotic system comprising a plurality of slave joints, and a master robotic system having a plurality of master brake joints, each corresponding to a respective one of the slave joints controllable by the master robotic system. Each master brake joint comprises an actuator operable to generate a braking force in response to a control signal corresponding to a sensed force sensed by the slave robotic system.

Disclosed herein is a method of translating a force of a slave robotic system to a master robotic system comprising: operating a master robotic system and a slave robotic system, the master robotic system comprising a master brake joint corresponding to a slave joint of the slave robotic system; transmitting a force data signal from the slave robotic system to the master robotic system; and generating a braking force within the master brake joint corresponding to the force data signal.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 7A illustrates an isometric view of a master brake joint in accordance with an example of the present disclosure;

FIG. 7B illustrates a schematic side view of the master brake joint of FIG. 7A in a disengaged state;

FIG. 7C illustrates a schematic side view of a master brake joint of FIG. 7A in a engaged state;

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result (structurally and/or functionally) as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial summary of technology embodiments is provided above and then specific technology embodiments are described in further detail below. This initial summary is intended to aid readers in understanding the technology more quickly but is not intended to identify key features or essential features of the technology nor is it intended to limit the scope of the claimed subject matter.

It will be appreciated by those skilled in the art that a braking force can be applied or removed in any rotational direction of the brake joints discussed herein. In other words, each brake joint can move bi-directionally and a braking force can be applied in either direction.

Figure 1A:
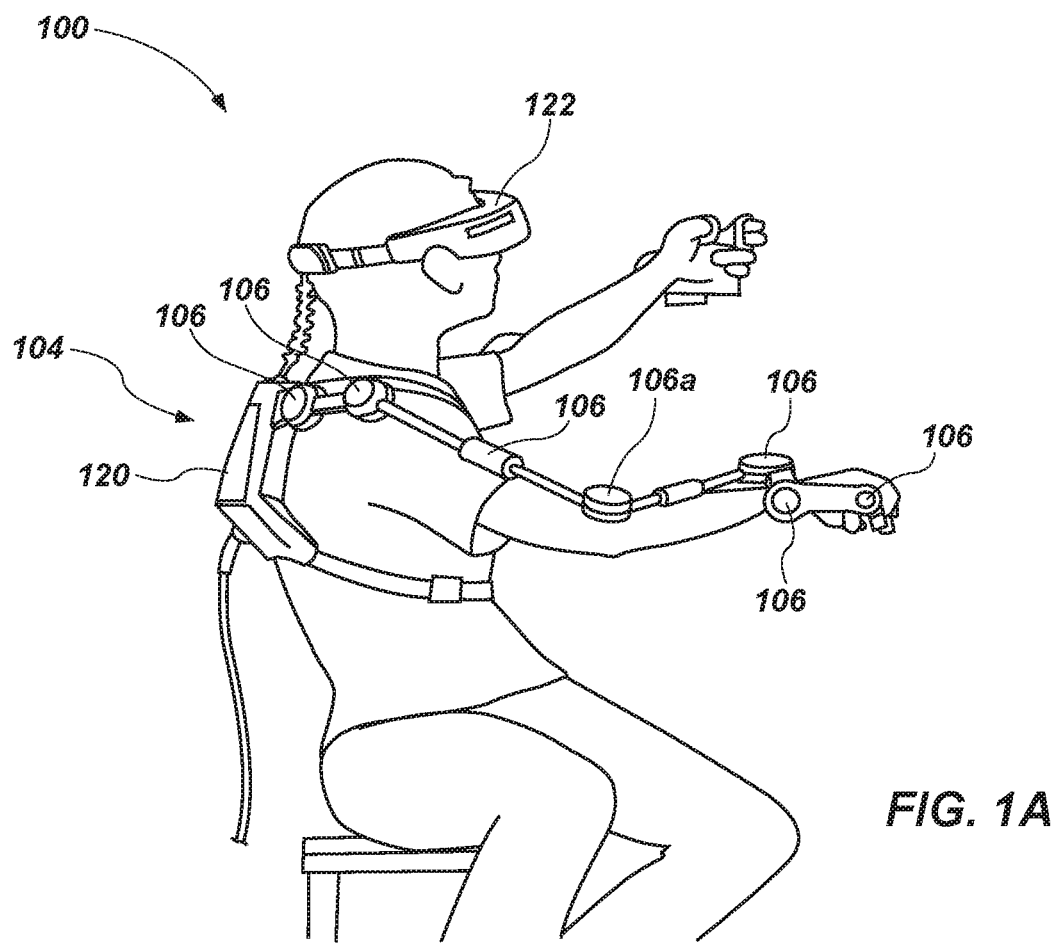
FIG. 1A illustrates a perspective view of a master robotic system having at least one master brake joint in accordance with an example of the present disclosure.
Figure 1B:
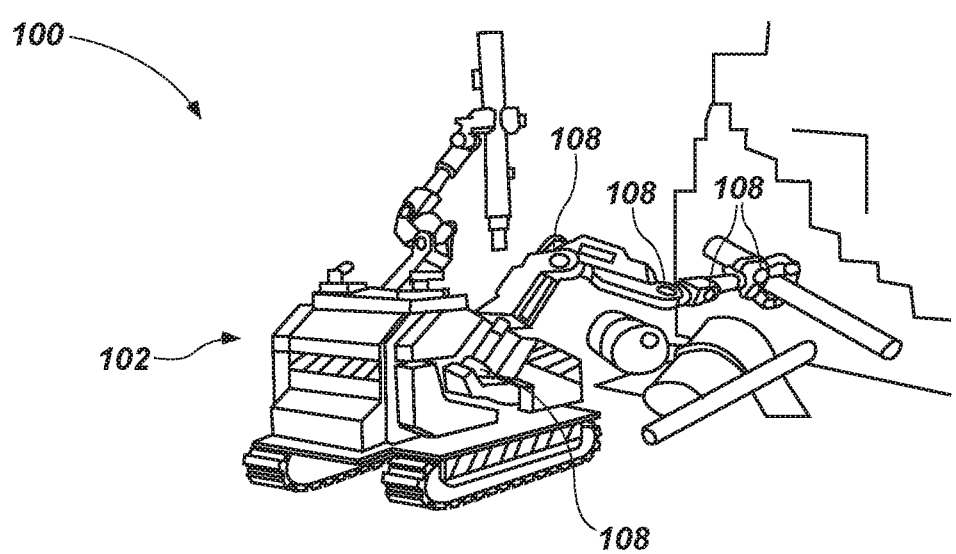
FIG. 1B illustrates a perspective view of a slave robotic system controllable by the master robotic system of FIG. 1A in accordance with an example of the present disclosure.

FIGS. 1A and 1B illustrate a system 100 for translating force reflection of a slave robotic system 102 to a master robotic system 104. Generally, the master robotic system 104 can comprise at least one master brake joint 106 associated with a corresponding slave joint 108 of the slave robotic system 102 for reflecting forces experienced at the slave joint 108 to the master brake joint 106. For instance, master brake joint 106a has a degree of freedom (DOF) that corresponds to a human elbow (flexion/extension), which corresponds to the controlled slave joint 108a (a slave elbow joint), wherein forces experienced within the slave joint 108a can be reflected in the master brake joint 106a in a desired proportion. In this example, a human operator can don the master robotic system 104 as an exoskeleton robotic assembly (e.g., upper and/or lower exoskeleton). It is noted that the master robotic system can comprise systems or interfaces operated (e.g., carried, worn in some examples) by humans. For example, the master robotic system can comprise an exoskeleton robotic system, a non-humanoid robot system (e.g., a master control arm), a virtual reality master robotic system (that may be paired with a headset or other user worn peripheral devices), and others as will be apparent to those skilled in the art. It is further noted that the slave robotic system can comprise any type of teleoperated robot, unmanned ground robot, aerial robot, humanoid robot, robotic leg, arm or hand, virtual robot, virtual avatar robot, and others as will be apparent to those skilled in the art.

In the examples provided herein, the brake-based joints discussed are provided in an input device as part of a master robotic system operable to control a slave robotic system. Any particular master brake-based joint assembly can have position and load sensors associated with one or more degrees of freedom (DOF(s)) of the brake-based joint and that are used in controlling a corresponding DOF of a slave joint of a slave robotic system, as further discussed below.

Figure 9:
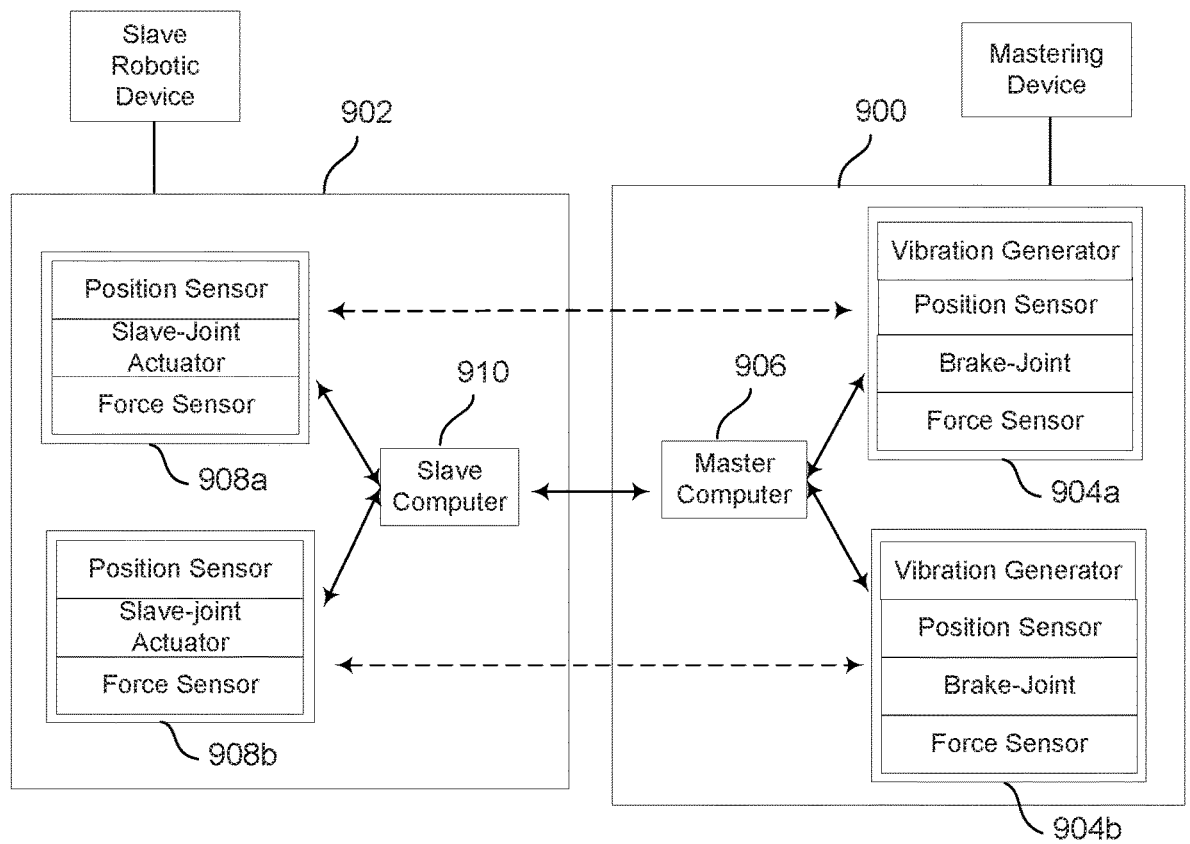
FIG. 9 illustrates a graphical representation of an exemplary operator control scheme for a mobile robotic lift assistance system in accordance with an example of the present disclosure.

Specifically regarding force-reflection, when the slave joint 108a experiences a resistance force or breaches or attempts to breach a restricted zone of travel (e.g., the right slave arm contacts a wall or lifts a mass or extends beyond a given point, etc.), a resistance force is sensed by load and/or position sensors associated with the slave joint 108a (e.g., see FIG. 9). The sensed resistance force can be the result of gravitational forces exerted on the slave joint due to holding or lifting a mass, for instance. In some examples, the resistance force can be an impact force, such as when an external force acts upon the slave robotic system 102, like a propelled object, a fighting solder, a falling object, etc. In any scenario, the slave robotic system 102 transmits force reflection data (e.g., a control signal) corresponding to a force sensed by the slave robotic system 102 to the master robotic system 104 (or other control system). The master robotic system 104 then causes (i.e., via a controller) the brake joint 106a to generate a braking force (apply or release) as force reflection that corresponds to the resistance force experienced by the slave robotic system 102 via the slave joint 108a. This force reflection may be configured to be proportional or not. Thus, the master robotic system 102 can, at least to some degree, "feel" what the slave robot "feels", and such force reflection can be transferred or translated as a resistance force to the operator (in the exoskeleton example) or to a humanoid robot, for instance. The braking force generated within the master robotic system is further discussed below. Notably, and as will be apparent to those skilled in the art, the master brake joints 104 of FIG. 1A can comprise any of the example brake joints discussed below and shown in FIGS. 2-7B, any equivalents thereof, or any others that would be apparent to those skilled in the art.

Generally, as with the exoskeleton type of master control device example, with force reflection the operator is provided with sensory input for operating a (e.g., right) slave arm, for instance, with a (e.g., right) master control arm (FIG. 1A). Unlike positional control, where the slave arm will operate to carry out the positional command from the master arm regardless of obstacles that may be in the path of the slave arm, force reflection provides a proportional force feedback to the operator via the master control arm to indicate loads that the slave arm is experiencing. For example, if the slave arm encounters an obstacle while executing a positional command from the master arm, a load sensor on the slave arm can provide load information that is communicated to the master control arm, and brake joint(s) operable within the master control arm can apply a proportional load to the operator based on the load information received. Such proportional load may be varied or different depending upon the particular operating environment and what may be desired to be applied to the operator. With such force feedback, the operator can more intuitively control the slave arm in the operating environment because it more closely resembles the operator's experience operating the operator's own body in everyday life. For example, if an object weighs 500 pounds (thereby exerting a force to the slave joint due to gravitational forces), the proportional force reflected load (i.e., via a braking force) experienced by the operator could be caused to be 10 pounds.

In certain aspects, force reflection implementation can include an increased load produced by the master control arm on the operator when the slave arm experiences an impact event. In other words, an impact sensed by the load sensors can be reflected to the user via the master control arm as a transient spike in load disproportionate to the normal proportional setting for force reflection. For example, when the slave arm collides with a wall, the load sensors of the slave arm sense the impact. To alert the operator that an impact has occurred, the master control arm can produce a load on the user that is disproportionately large relative to the current proportional force reflective setting for a brief period of time that can effectively represent the impact to the operator. For example, the force on the operator produced on an impact could be so disproportionately large that the operator would not be able to further move the master arm, effectively generating a hard stop of the master control arm regardless of the strength of the user or any existing momentum. Thus, force reflection can provide a safety feature of the robotic system. Examples of achieving such operations are further discussed below regarding the examples of FIGS. 2-9.

In the exoskeleton example of FIG. 1A, the master robotic system 100 can comprise a backpack 120 having an energy storage device (e.g., a battery) configured to supply electrical power to various components, such as the sensors and actuators of each brake joint 106. The energy storage device can serve as a primary power source, or as a back-up power source (where the backpack is wired to an external power supply). A virtual headset 122 can be electrically coupled to the backpack 120 (or communicatively coupled to an external computer system). The headset 122 can be configured to display real-time video and other information as transmitted from cameras and other sensors on the slave robotic system 102, for instance. Alternatively or concurrently, the headset 122 can display an augmented reality or virtual three-dimensional environment including a rendering of a particular slave robotic system operating within the augmented or virtual reality world or environment. In this manner, position and force data associated with a slave robot or slave interface is determined in the virtual world and then transmitted to the master robotic system for force reflection purposes of relevant master brake joints. The backpack 120 can comprise a master computer having a variety of electrical components for receiving, processing, and transmitting signals, as further discussed below.

It is noted that the brake-based joint constraint mechanisms and systems discussed herein could be incorporated into a joint of any robotic assembly, system or device, such as a humanoid robot, or the robotic assembly described in U.S. patent application Ser. No. 13/332,165 filed Dec. 20, 2011, which is incorporated by reference herein in its entirety, wherein, in this case, there may not necessarily be an exoskeleton donned by the operator, but rather, the operator could be operating one or more master control arms as taught therein, and could experience force reflection from the slave arms via one or more brake joints provided in the one or more master control arms. Essentially, the present disclosure contemplates that a resistance or brake-based joint constraint mechanism or system, as taught herein, could be employed in any type of robot or robotic device where force reflected from one robotic device (e.g., a slave) is desired to be transferred, in some proportion, to an operator (e.g., one operating a master control device).

Figure 2:
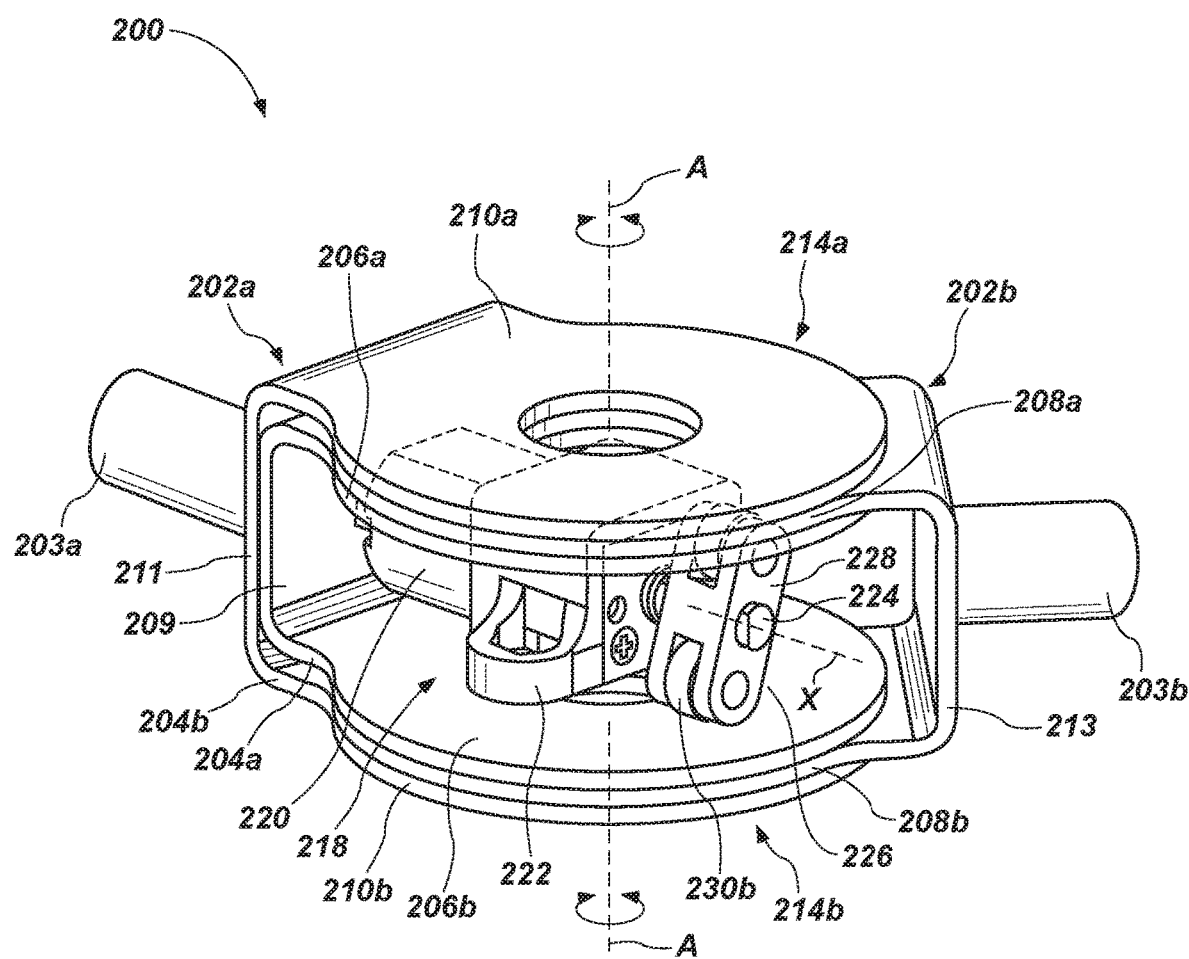
FIG. 2 illustrates an isometric view of a master brake joint in accordance with an example of the present disclosure.
Figure 3A:
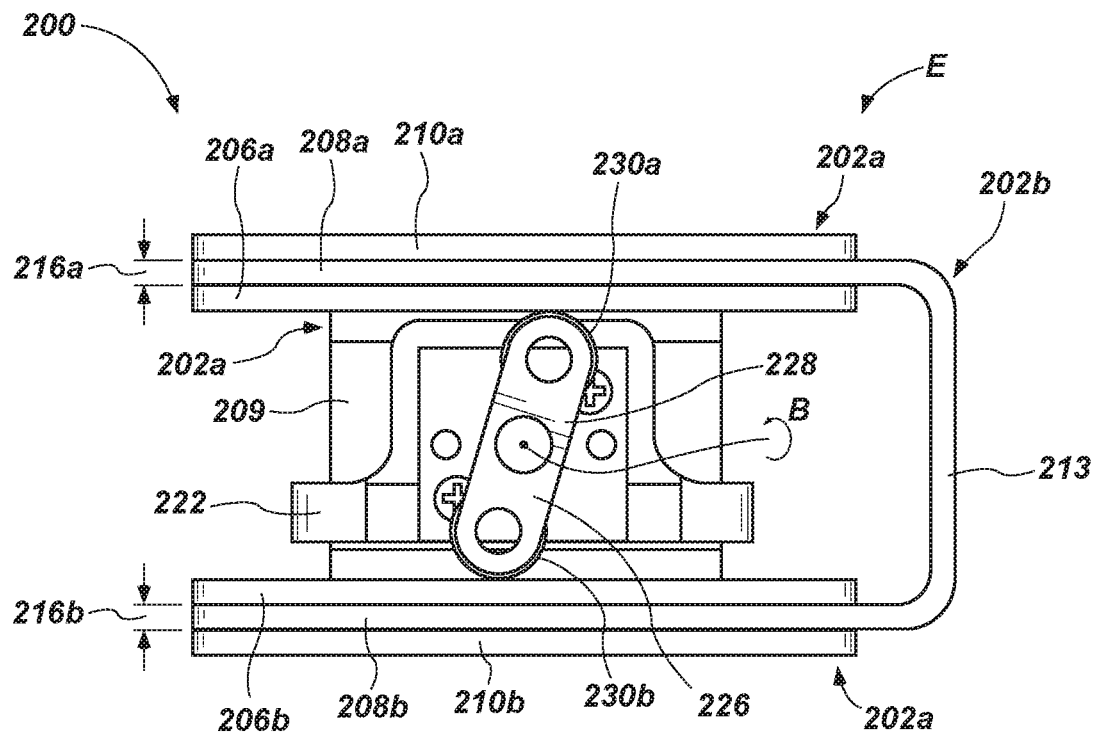
FIG. 3A illustrates a side view of the master brake joint of FIG. 2 in an engaged configuration.
Figure 3B:
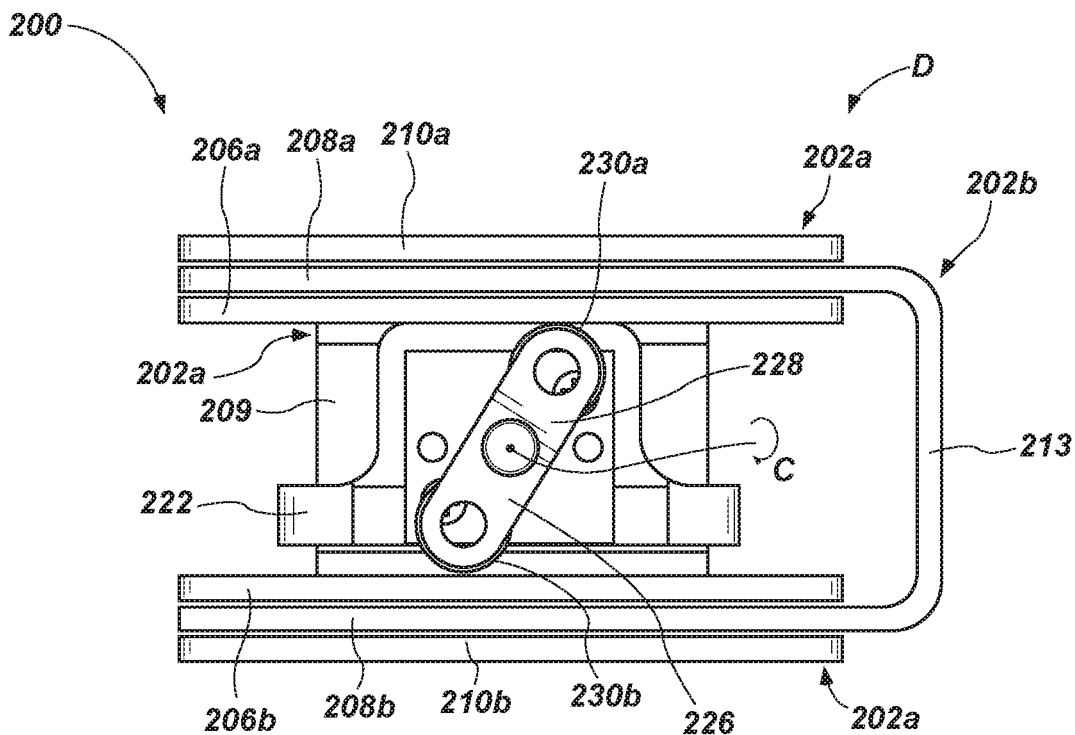
FIG. 3B illustrates a side view of the master brake joint of FIG. 3A in a disengaged configuration.

FIGS. 2, 3A, and 3B illustrate one example of a master brake joint 200 (or "brake assembly") operable to transfer a resistance force to an operator through a master robotic system, the force corresponding to a force reflected from a slave robotic system, such as described above and shown in FIGS. 1A and 1B. FIG. 2 illustrates the master brake joint 200, with FIG. 3A showing a side elevation view of the brake joint 200 in an engaged configuration E, and FIG. 3B showing a disengaged configuration D.

The brake joint 200 can comprise a first braking component 202a associated and operable with a first robotic link 203a (e.g., a first support member moveable via a joint) and a second braking component 202b associated and operable with a second robotic link 203b (e.g., a second support member moveable relative to the first support member via the joint). The first and second robotic links 203a and 203b can be rigid support members (e.g., aluminum, steel, etc.) or other types of support members (e.g., spring-type) of a master robotic assembly, such as support members of the exoskeleton-type master robotic system of FIG. 1A. The first and second robotic links 203a and 203b are illustrated generically as rigidly attached to respective first and second braking components 202a and 202b. Those skilled in the art will recognize that they can be coupled or joined using any suitable means, such as with additional components like various interim or adaptor robotic support member interface components, or via a housing that houses the brake joint 200 (e.g., similar to FIG. 7A discussed below).

As mentioned above, the example brake joints discussed herein can comprise input master brake joints, meaning that they can provide a joint constraint function within the master robotic system via the resistance-based braking mechanism, and (concurrently) provide an input function for a master-slave system. Accordingly, the brake joint 200 can comprise a position sensor and/or a load sensor operable within the brake joint 200 and/or the support members or links operable therewith.

The first and second braking components 202a and 202b can comprise a multi-disk configuration (e.g., the plurality of disks forming a type of interleaved sheet brake configuration) that facilitates torque in parallel. More specifically, the first braking component 202a can comprise an inner c-channel member 204a and an outer c-channel member 204b (each having a c-channel configuration). The inner c-channel member 204a can comprise an upper compression disk 206a and a lower compression disk 206b formed together about an inner central support portion 209 that extends between the upper and lower compression disks 206a and 206b. Similarly, the outer c-channel member 204b can comprise an upper compression disk 210a and a lower compression disk 210b formed together about an outer central support portion 211 that extends between the upper and lower compression disks 210a and 210b. The inner central support portion 209 and the outer central support portion 211 can be rigidly secured together (e.g., by an adhesive or other fastening means), such that the inner c-channel member 204a and the outer c-channel member 204b are fixed and non-moveable relative to one another. As shown, the inner c-channel member 204a can be nested within the outer c-channel member 204b, such that the compression disks 206a, 206b, 210a and 210b are substantially aligned with one another other along their perimeter profiles and about axis A, the compression disks 206a, 206b, 210a and 210b being of a similar size and configuration.

Compression disks 206a and 210a collectively comprise a pair of upper compression disks 214a, and compression disks 206b and 210b collectively comprise a pair of lower compression disks 214b. The inner and outer c-channel members 204a and 204b are sized and configured, such that the pair of upper compression disks 214a define an upper gap 216a (FIG. 3A), and the pair of lower compression disks 214b define a lower gap 216b. The upper and lower gaps 216a and 216b can be substantially parallel to each other (e.g., the gaps being situated about respective parallel horizontal planes as viewed in FIG. 3A).

The second braking component 202b can comprise a single c-channel member having an upper compression disk 208a and a lower compression disk 208b spatially separated from and parallel to one another, with each being supported about a central support portion 213, the robotic linkage 203b being coupled or otherwise joined to the central support portion 213.

Each of the first and second braking components 202a and 202b can be comprised of Teflon impregnated aluminum (such as provided under the trade names Tufram® or Tiodize® or Hardtuf). Other materials such as composites (e.g., PTFE-PTFE, FEP-FEP, PFA-PFA, PTFE-PEEK) can be used. Materials are desirable that have the best overall combination of wear rate under load, friction coefficient versus load, relative difference between static and dynamic friction coefficients, and cost savings.

The first and second braking components 202a and 202b are sized and configured to mate with one another in order to form the brake joint 200, and to function together to provide a braking function for constraining the relative movement of the first and second robotic links 203a,203b operable with the brake joint 200. Specifically, the upper compression disk 208a of the second braking component 202b is frictionally and rotatably (about rotational axis A) arranged within the upper parallel gap 216a, and the lower compression disk 208b of the second braking component 202b is frictionally and rotatably (about rotational axis A) arranged within the lower parallel gap 216b. As will be further discussed below, upon actuation of an actuator 218 in a first direction (FIG. 3A), the pair of upper compression disks 214a of the first braking component 202a are caused to "pinch" or compress the upper compressed disk 208a of the second braking component 202b, and concurrently the pair of lower compression disks 214b of the first braking component 202a are caused to pinch or compress the lower compression disk 208b of the second braking component, which collectively generates a resistance-based braking force within the brake joint 200 (no matter the rotational direction of the brake joint 200), the braking force constraining movement of the first robotic link 203a relative to the second robotic link 203b. Notably, as in the example shown, the compression disks of the first and second braking components 202a and 202b can comprise c-channel members that are relatively thin relative to their respective sizes (i.e., they can comprise a thin profile design), with each being formed from a single piece of aluminum having rounded corner transitions. Thus, the compression disks can slightly flex or deflect (when actuated upon) to facilitate the resistance-based braking force. Of course, those skilled in the art will recognize that the first and second braking components can be configured in an inverse manner, such that the second braking component comprises first and second c-channel members, with the first braking component comprising a single c-channel member operable to fit within upper and lower gaps formed by the first and second c-channel members of the second braking component. In addition, those skilled in the art will recognize that the compression disks can be configured in a variety of different ways, and that these can be supported relative to one another in a variety of different ways. As such, those specific examples shown in the figures and discussed herein are not intended to be limiting in any way.

In one example, the actuator 218 can comprise an electric motor 220 coupled to a support housing 222. The motor 220 can also be rigidly coupled to the inner central support portion 209 of the inner c-channel member 204a of the first braking component 202a in a manner that spatially positions the motor 220 and the housing 222 away from (i.e., not in contact with) either of the upper and lower compression disks 206a and 206b of the first braking component 202a (see FIG. 3A). The support housing 222 can house a transmission component (not shown) that gears-down rotational movement provided by the electric motor 220. The actuator can be configured, such that the electric motor 220 (or transmission) transfers rotational movement to an actuator shaft 224. The actuator shaft 224 can be rotated bi-directionally by the electric motor 220 about the central axis X of the actuator shaft 224 to facilitate generation of the braking force (i.e., to either increase or decrease an amount of generated braking force), and to facilitate removal of the braking force. The bi-directional rotation of the actuator shaft 224 can be applied with the brake joint being rotated in any direction to apply/remove the braking force in any rotational direction of the joint. In another example, an elastic element, such as a spring, can be coupled to the actuator shaft 224 in a manner that rotatably biases the actuator shaft 224 in a clock-wise direction (i.e., an "off" position), so that when the electric motor 220 releases or removes an actuation force, the elastic element automatically biases or moves the actuator shaft 224 accordingly.

An actuation member 226 can be fixedly attached to the actuator shaft 224. The actuation member 226 can comprise a block-like or other rigid body structure 228 having an aperture therein for receiving at least a portion of the actuator shaft 224, thereby facilitating the coupling of the actuation member 226 to the actuator shaft 224. The rigid body 228 of the actuation member 226 can further comprise first and second arms extending in opposing directions from the aperture and the actuator shaft 224, each of the arms comprising ends configured to releasably engage (i.e., engage and disengage) and interface with one or both of the first and second braking components 202a,202b. In operation, rotation of the actuator shaft 224 in a first direction (e.g., in a counter clockwise direction (arrow B of FIG. 3A)) causes the actuation member 226 to similarly rotate. Upon sufficient rotation, the arms of the rigid body 228 of the actuation member 226 are caused to concurrently engage and apply a force to the upper compression disk 206a and the lower compression disk 206b of the first braking component 202a. Such rotational actuation generates a joint braking force by compressing the upper and lower compression disks 208a and 208b of the second braking component 202b between the upper and lower pairs of compression disks 214a, 214b, respectively. This compression braking configuration is illustrated in FIG. 3A where the brake joint 200 is in the engaged configuration E. In the engaged configuration, the brake joint 200 is at least partially braked, and capable of transferring a corresponding force to the operator, wherein the operator is able to experience a degree of resistance within the operated master robotic system being operated.

Conversely, as illustrated in FIG. 3B, rotating the actuation member 226 in a second, opposite direction (e.g., a clockwise direction as depicted by arrow C) causes the arms of the rigid body 228 of the actuation member 226 to move in a direction so as to decrease and eventually remove the applied braking force as the actuation member 226 releases or disengages and rotates away from the upper and lower compression disks 206a and 206b of the first braking component 202a. In other words, rotation in this direction causes the various compression disks of the first and second braking components 202a,202b to be substantially decompressed in accordance with the degree of rotation of the actuation member 226. It is noted that the compression disks in FIG. 3B are shown separated from each other for purposes of illustration, but in practice adjacent disks could be slidably engaged with one another, providing slidable rotation between them, such as when no braking force is exerted, or a less than locking braking force is exerted. The various compression disks are intended to be slidable relative to one another in order to allow the brake joint to function as a normal joint. In one aspect, the compression disks can comprise a relatively low coefficient of friction, for example, as a result of them being formed of Teflon impregnated aluminum. Thus, because adjacent disks will likely have some degree of contact with one another, the actuator 218 can be configured so that the actuation member 226 is not required to displace the disks very far (e.g., a few millimeters linearly) in order to apply/increase and/or reduce/remove a braking force. For instance, the distance between the compression disks 206a and 206b, as well as the length of the arms of the actuation member 226, can be designed and coordinated, such that the actuation member 226 need only be rotated a few degrees or more to impart a relatively large braking force. One benefit of this is that power requirements can be minimized as only a small amount of electrical energy is needed to actuate the actuation member 226 and apply a sufficient or desired braking force within the brake joint 200. This configuration contributes to minimizing power dissipation of each brake joint, which minimizes the power requirements of an entire master robotic system, which thereby increases the amount of time that a mobile master robotic exoskeleton can be operated, for instance if running off of batteries or another diminishing type of power source.

The motor 220 can be electrically and communicatively coupled (wirelessly or directly wired) to a computer or processor of the master robotic system (e.g., FIGS. 1 and 9) to facilitate operator control of the motor 220 and the brake joint 200. For example, an operator can control the rotational direction, torque, and velocity of the actuator shaft 224 and the actuation member 226 to achieve a particular, variable braking force that corresponds to a reflection force experienced by a corresponding slave joint, as discussed above. Moreover, by controlling the degree, velocity and magnitude of rotation of the actuation member 226, the brake joint 200 can be dynamically controlled to generate a dynamic braking force, such as when forces at the slave joint and the resulting generated reflection forces experienced by the master robotic system change during master control of the slave joint, or as needed or desired. In other words, for a given force at a slave joint, a magnitude of the braking force generated within the brake joint can be controlled and varied, such that the operator can experience different degrees of resistance. The braking force that can be generated within the brake joint can range between one where no braking force is applied, to a resistive braking force where the brake joint is still permitted to rotate with a degree of resistance, to a braking force that completely brakes and locks the brake joint.

It should be appreciated that, in some examples, a "variable" braking force can effectively include a binary application and removal of the braking force (i.e., either "on" or "off"). In other words, in a system that is capable of applying a variable braking force, such is not required as only a braking force having a single or first magnitude can be applied and then removed. Specifically, a zero braking force can be achieved by a particular brake joint (i.e., zero force is applied by the actuator), or a full/maximum braking force is experienced by said brake joint (i.e., the actuator is fully engaged to its maximum range of movement or power, and the brake joint is completely locked up). Thus, the braking force can comprise a first magnitude, or can be non-variable. In other examples (or in conjunction with the same binary example), a particular brake joint having a "variable" braking force can mean that the braking force can vary within a range between a zero braking force up to a maximum braking force (including the zero braking force and the maximum braking force), and such braking force can vary in real-time as a particular slave joint experiences changing/varying forces during operation of a salve robotic system. Varying the braking force can provide the brake joint with a plurality of magnitudes of braking force that can be achieved.

In one aspect, the actuation member 226 can comprise a rigid body 228 as discussed above, and can further comprise a first or an upper roller 230a, and a second or lower roller 230b rotatably coupled or otherwise supported in the ends of each of the oppositely extending arms of the rigid body 228. The rigid body 228 can be configured as an elongated, rounded rectangular-shaped body comprised of metal, such as steel, aluminum, titanium, etc. Each roller 230a and 230b can be rotatably coupled to the ends of the actuator body 228 by pin fasteners (not shown) such that, upon rotating the actuation member 226 via the motor 220, the rollers 230a and 230b freely roll or rotate about the surfaces of the respective upper and lower compression disks 206a,206b as they contact the respective upper and lower compression disks 206a,206b. This "rolling" arrangement provides the advantage of reducing friction between the actuation member 226 and the disks 206a,206b of the first and second braking components, respectively, as the braking joint 200 is operated, which reduced friction also functions to minimize wear on the actuation member 226 (and the disks). This reduction in friction represents a reduction relative to the friction that would be generated by an actuation member having similar oppositely extending arms that contact and slide about the first and second braking components, but without any rollers.

In another aspect, the actuation member 226 may be configured without rollers. Indeed, although rollers 230a, 230b are not required, without these, the actuated actuation member 226 would be caused to slide about the same disk surfaces, wherein an increased amount of surface friction may be generated. Over time and repeated actuation of the actuation member 226, the wear of the various components could be greater as compared with an actuation member incorporating rollers. This could also result in certain inefficiencies that may not exist or that may be reduced as compared to the use of an actuation member having rollers.

In still another aspect, other types of friction reducing members can be formed or coupled about the ends of the arms of the actuation member 226 that provide or facilitate reduced friction between the actuation member 226 and the disks. For example, this can include a static friction reducing insert formed of a material having a coefficient of static friction that is less than that of the material making up the rigid body 228 of the actuation member 226. Thus, by using rollers or some other friction reducing member, the life of the actuation member 226 can be maximized, thereby prolonging the life of the brake joint 200. In one test, the operational life of the brake joint 200 was 10,000 or more cycles at full load. Notably, the central axis X of the actuator shaft 224 is arranged proximately along the centerline of the brake joint 200, which helps to reduce motor bearing loads.

The brake joint 200 can be configured, such that the rollers 230a and 230b contact particular surface locations of the upper and lower compression disks 206a and 206b, respectively, proximate or at the rotational axis A of the brake joint 200. In other words, such surface contact locations can be made to be closer to rotational axis A than outer perimeter portions of the first and second braking components 202a and 202b. However, in the case of brake joints associated with hands of an operator, the brake joints can be positioned about or on the tops of the digits/fingers due to the limited space between fingers. Each of the other actuators discussed herein can also be arranged proximate or at the rotational axis of a respective brake joint.

As illustrated in FIG. 2, a total of six disks are incorporated into the brake joint 200, and the surface area of each disk is relatively large (effectively defining the outer boundaries of the entire brake joint). With this configuration, the compression loads applied by the actuator 220 to the disks can be distributed over a large area of each respective surface of the disks. And, when implementing braking components 202a and 202b comprised of Teflon impregnated aluminum or PTFE graphite composite, wear factor can be approximately 5×10-9 to 10-8 mm$^2$/N, and is of the order of approximately 5 micrometers per disk for a 10 disk brake, in one example.

In cases where the first and second braking components 202a and 202b are comprised of low friction materials, the brake joint can be very lightweight relative to the amount of braking force generated. Furthermore, the double acting or bi-directional, parallel braking force imparted by the actuation member 226 can effectively increase the total braking force and torque by 2× (or more) compared to a unidirectional actuator. For example, in a master brake joint for a shoulder flexion/extension DOF, the range of motion (ROM) could be targeted at approximately 240-270 degrees. The shoulder brake joint (e.g., one similar to the brake joint 200) can be formed of Teflon impregnated aluminum (or composites), can be approximately 2 inches in diameter and 1 inch in height, and can weigh approximately 60 grams. The brake torque maximum can be approximately 30 N-m, and the brake torque minimum (e.g., with the joint in "free swing" mode where no braking force is applied) can be approximately 0.2-0.4 N-m. The closed loop torque bandwidth can be approximately 20 to 30 Hz at −3 dB. Finally, the torque to weight ratio can be approximately 500 N-m/kg, which is very large for a 2 inch diameter master input brake joint weighing only 60 grams. As can be seen, the brake joint 200 (and others discussed herein) can have a very high torque to weight ratio in a compact, low cost and low power package.

Figure 4:
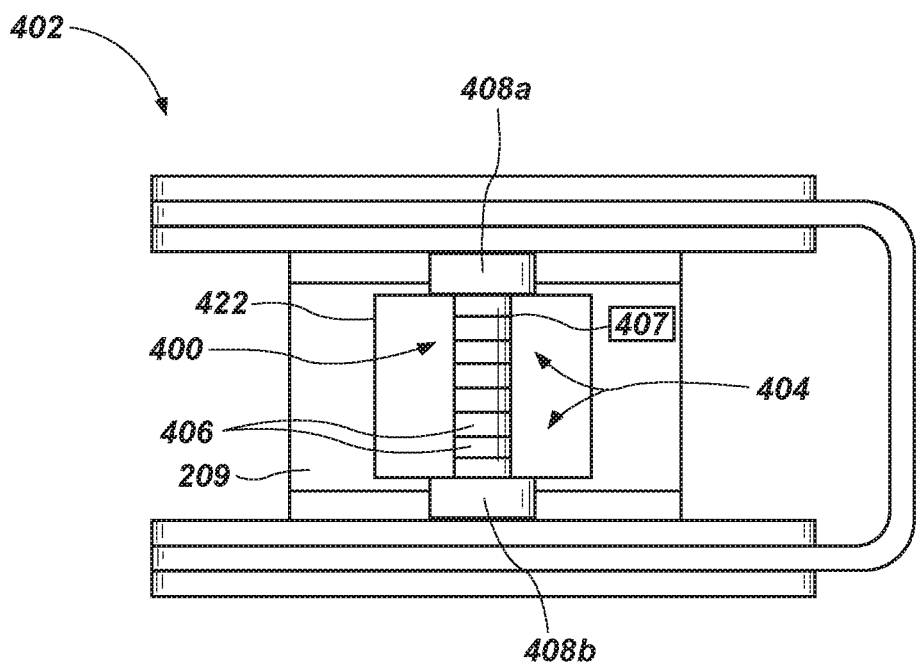
FIG. 4 illustrates a side view of a master brake joint in accordance with an example of the present disclosure.
Figure 5:
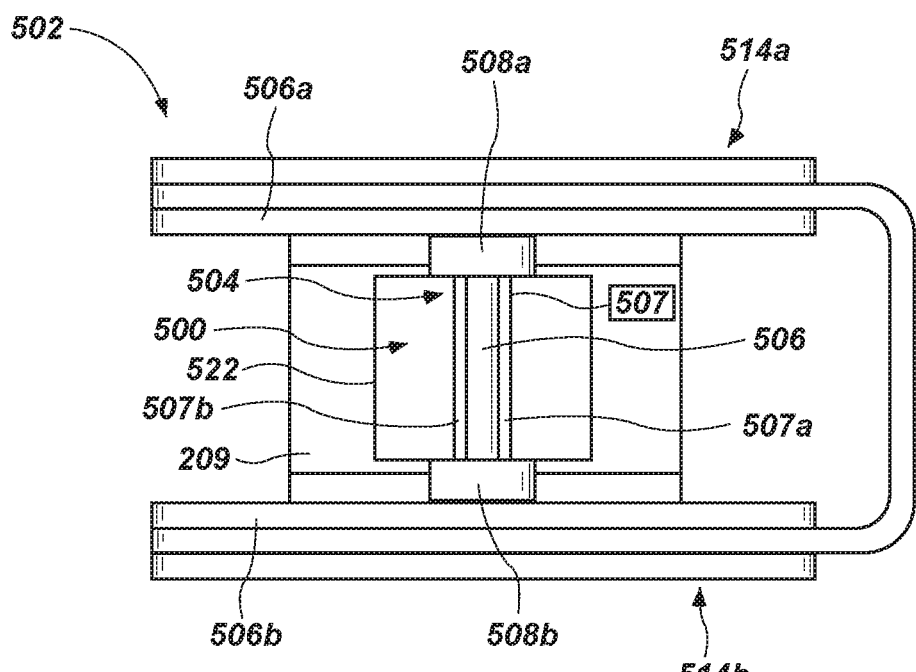
FIG. 5 illustrates a side view of a master brake joint in accordance with an example of the present disclosure.
Figure 6:
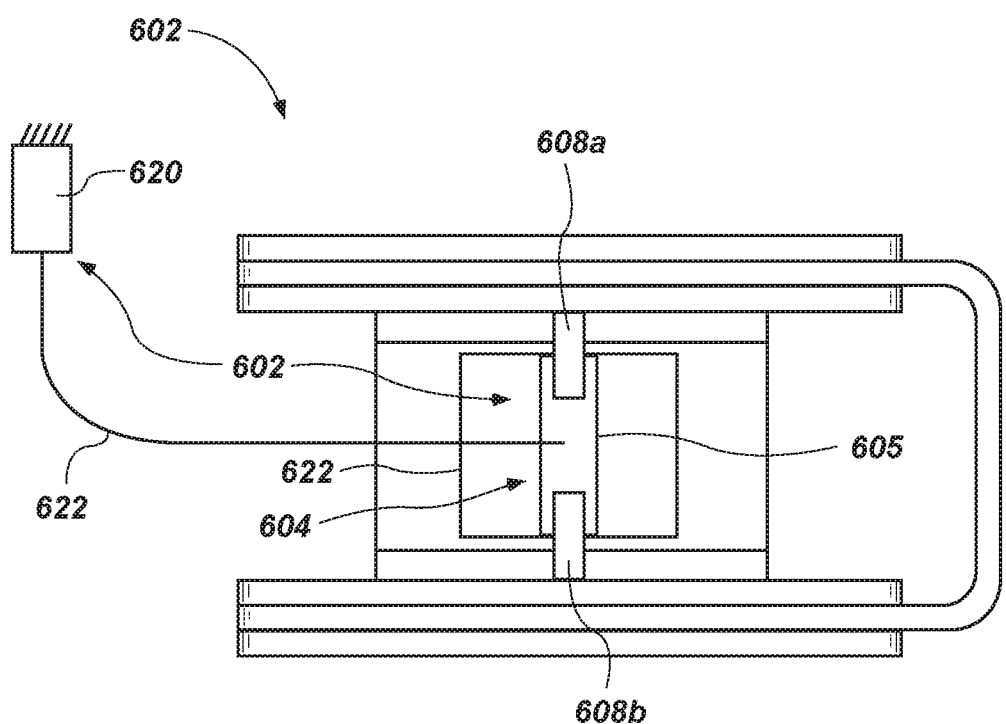
FIG. 6 illustrates a side view of a master brake joint in accordance with an example of the present disclosure.

FIGS. 4, 5, and 6 illustrate other exemplary types of dynamically controlled actuators that could be arranged between the pair of upper and lower compression disks 214a and 214b of FIGS. 2-3B.

For example, with reference to FIG. 4 (and with concurrent reference to the features labeled in FIGS. 2-3B), a piezoelectric actuator 400 can be operable to generate a braking force about a brake joint 402. The piezoelectric actuator 400 can effectively replace the actuation member 226 of FIGS. 2-3B. Many of the other like or similar components and elements of the brake joint 202 shown in FIGS. 2-3B are included in this example, as shown, and can function in a similar manner while being operable with the piezoelectric actuator 400. As such, the brake joint 402 is discussed herein with reference to FIG. 5, as well as FIGS. 2-3B, with the example of FIG. 5 comprising similar components and elements aside from the piezoelectric actuator 400 and the source for actuating the dielectric actuator 400. The piezoelectric member 404 can be structurally supported by a housing 422 that is rigidly supported by the first braking component 202a (housing 422 is shown as a generic support housing, but it can be similar in shape and function to housing 222). Other suitable support structure means can be implemented. The piezoelectric member 404 can comprise a stack of piezoelectric components 406, and an upper biasing component 408a and a lower biasing component 408b.

The stack of piezoelectric components 406 can be a plurality of ceramic piezoelectric devices electrically coupled to a voltage source 407, which can be either a local battery supported by the brake joint 402 or a distally located electrical power source, such as that of a master robotic system. When an electric field is applied to the stack 406, it can undergo deformation that is roughly proportional to the applied electric field. There are a variety of different types of piezoelectric actuators that can be implemented in the brake joint 402. For example, and not intending to be limiting in any way, piezoelectric actuators based on piezoelectric ceramics, such as Lead Zirconate Titanate (PZT), have large stress capabilities (~40 MPa) and can operate at high frequency (100 kHz or more), and require negligible or minimal power to sustain an induced stress. They also have very high displacement resolution, which makes them very well suited for nano-displacement position stages while having a low maximum strain (~$10^{-3}$). Some available piezoelectric actuators have low strain and high blocking force, such as those manufactured by PI Ceramic Company and Cedrat Technologies company that provide a piezo stack amplification mechanism. Thus, the piezoelectric actuator 400 can further comprise such motion amplification mechanisms with a reduced force capability. Other types of piezoelectric actuators can include a surface-mounted piezoelectric actuator that can be operated to deform one or more disk(s), which would increase the friction force between the disks when actuated by an electric field. Other configurations include incorporation of a piezoelectric actuator operable to constrict a piece of material to make it thicker, thereby generating a braking force against the disks. For instance, a sheet of rubber can be coupled to a piezoelectric actuator and situated near or against opposing disks, and in a manner to contract along its planar surface upon actuation of the piezoelectric actuator, which deforms the sheet of rubber perpendicular to its planar surface, thereby becoming thicker when contracted in this manner. In another example, a stack of piezoelectric elements can be arranged in a spiral shape between opposing disks, and its overall length can change with the inherent mechanical advantage of its spiral shape, so that small deformations in the stack produce are effectively amplified mechanically to cause compression of the disks.

As shown in FIG. 4, upon a predetermined electric field being applied to the stack 406, the upper biasing component 408a displaces (e.g., a distance proportionate to the electric field) to apply a force to the upper compression disk 206a while the lower biasing component 408b concurrently displaces in an opposite direction (e.g., a distance proportionate to the electric field) to apply a force to the lower compression disk 206b. As discussed regarding FIGS. 2-3B, such double acting or bi-directional parallel actuation causes the upper pair of compression disks 214a to frictionally compress the upper compressed disk 206a, and causes the lower pair of compression disks 214b to frictionally compress the lower compressed disk 206b, such that upon rotation, this operation generates a braking force within the brake joint 402, which can be incorporated into a robotic joint, such that the braking force is applied between the first robotic link 203a and the second robotic link 203b (e.g., FIG. 2), which braking force can correspond to a force generated and reflected from a corresponding slave joint.

Conversely, reducing/switching (or removing) the electric field a predetermined amount causes the stack 406 to retract or "shrink" in a direction towards one another a distance proportionate to the amount of the electric field applied. Consequently, the upper and lower biasing components 408a and 408b move towards each other, thereby reducing or removing a braking force about the brake joint 402.

FIG. 5 illustrates another example of an actuator for a brake joint 502 that comprises a dielectric actuator 500 operable to generate a braking force about the brake joint 502. The dielectric actuator 500 can effectively replace the actuator 218 of FIGS. 2-3B. Many of the other like or similar components and elements of the brake joint 202 shown in FIGS. 2-3B are included in this example, as shown, and can function in a similar manner while being operable with the dielectric actuator 500. As such, the brake joint 502 is discussed herein with reference to FIG. 5, as well as FIGS. 2-3B, with the example of FIG. 5 comprising similar components and elements aside from the dielectric actuator 500 and the source for actuating the dielectric actuator 500.

The dielectric actuator 500 can comprise a dielectric member 504 that is structurally supported by a housing 522, which can be rigidly supported by the central support portion 209 of the first braking component 202a (housing 522 is shown as a generic support housing, but it can be similar in shape and function to housing 222). The dielectric member 504 can comprise a dielectric elastomer member 506 (e.g., one formed of carbon black and graphite material) disposed between a first flexible electrode 507a and a second flexible electrode 507b, as shown. A first biasing component 508a and a second biasing component 508b can each be fixed to ends of the packaged dielectric elastomer member 506 and the electrodes 507a and 507b. The first and second biasing components 508a and 508b can comprise a variety of different configurations, such as different suitable shapes and forms that reduce friction and reduce weight, for instance.

The dielectric actuator 500 further comprises a voltage source 505 operable to actuate the dielectric actuator 500. When an electric field is applied between the first and second electrodes 507a and 507b, they are attracted to one another and are caused to move an inward lateral distance (i.e., toward one another) that is in proportion to a voltage of the applied electric field. Such inward movement causes the dielectric elastomer member 506 to stretch and expand, thus causing the upper biasing component 508a to displace (a distance proportionate to the electric field) to apply a force to and bias the upper compression disk 206a, while the lower biasing component 508b concurrently displaces in an opposite direction (a distance proportionate to the electric field) to apply a force to and bias the lower compression disk 206b. Specifically, and as similarly discussed regarding FIGS. 2-3B, such double acting, or bi-directional actuation causes the upper pair of compression disks 214a to frictionally compress the upper compression disk 206a and causes the lower pair of compression disks 214b to frictionally compress the lower compression disk 206b, such that upon rotation, this operation collectively generates a braking force within the brake joint 502, which can be incorporated into a robotic joint, such that the braking force is applied between a first robotic link (e.g., see first robotic link 203a of FIG. 2) relative to a second robotic link (e.g., see second robotic link 203b of FIG. 2) as corresponding to a force generated and reflected from a corresponding slave joint (e.g., see slave joint 108 of FIG. 1B).

Conversely, reducing/switching or removing the electric field a predetermined amount causes the dielectric actuator 500 to retract or "shrink" in proportion to the applied electric field, or the absence thereof. Consequently, the first and second biasing components 508a and 508b move towards each other, thereby reducing or removing the braking force as it exists within the brake joint 502.

Dielectric actuators can be advantageous because large work per unit volume per stroke (as provided by formula $W_{eY} \sim 3.4$ MJ/m$^3$) is made possible, with strain that may exceed 100%. That is, because strain is a measure of deformation representing the displacement between particles in the body relative to a reference length, a dielectric actuator can strain beyond its original 100% reference length. Moreover, negligible power is required to sustain a given load. Various types of dielectric actuators can be implemented and caused to operate with the brake joint 502. For example, Parker Hannifin Corporation markets dielectric actuators that could be suitable to provide a brake joint in accordance with this example.

Another example is a dielectric actuator having a plurality of sheets or layers of dielectric material that are arranged in a sheet-like configuration together, such that upon the supply of electricity, they become thicker, thereby biasing opposing disks to generate a braking force about the disks.

FIG. 6 illustrates another example of an actuator in the form of a hydraulic actuator 600 (or other fluidic actuator, such as pneumatic gas actuator) operable to generate a braking force about a brake joint 602. The hydraulic actuator 600 can effectively replace the actuation member 226 of FIGS. 2-3B. Many of the other like or similar components and elements of the brake joint 202 shown in FIGS. 2-3B are included in this example, as shown, and can function in a similar manner while being operable with the hydraulic actuator 600. As such, the brake joint 602 is discussed herein with reference to FIG. 6, as well as FIGS. 2-3B, with the example of FIG. 6 comprising similar components and elements aside from the hydraulic actuator 600 and the source for actuating the hydraulic actuator 600. In one example, a hydraulic assembly 604 can be structurally supported by a housing 622 that is rigidly supported by the central support portion 209 of the first braking component 202a. The hydraulic assembly 604 can comprise a housing 605 containing an operating hydraulic fluid (or air fluid). An upper piston 608a and a lower piston 608b can be movably supported and positioned on or about opposing ends of the housing 605 (as shown).

A hydraulic actuation mechanism 620 (or other fluidic actuation mechanism, such as pneumatic gas mechanism) can be fluidly coupled to the housing 605 to supply operating fluid to the housing 605 via a pressure line 622. The hydraulic actuation mechanism 620 can comprise a compact master cylinder configuration. Thus, a compact electric motor operable with a ball screw of the hydraulic actuation mechanism 620 could be operated to control fluidic pressure within the housing 605. For instance, the hydraulic actuation mechanism 620 can be configured to apply a predetermined fluid pressure to the housing 605, wherein fluid pressure within the housing 605 causes the upper piston 608a to displace (a distance proportionate to the applied fluid pressure) to apply a force to and bias the upper compression disk 206a, while the lower piston 608b concurrently displaces in an opposite direction (a distance proportionate to the applied fluid pressure) to apply a force to and bias the lower compression disk 206b.

As discussed regarding FIGS. 2-3B, such bi-directional actuation causes the upper pair of compression disks 214a to frictionally compress the upper compressed disk 206a and causes the lower pair of compression disks 214b to frictionally compress the lower compressed disk 206b, such that upon rotation, this operation collectively generates a braking force within the brake joint 602, which can be incorporated into a robotic joint, such that the braking force is applied between about the first robotic link 203a relative to the second robotic link 203b (FIG. 2) as corresponding to a force generated in and reflected from a corresponding slave joint (e.g., as in FIGS. 1A and 1B). Conversely, reducing or removing the fluid pressure a predetermined amount causes the pistons 608a and 608b to retract towards each other a distance proportional to the reduced or removed fluid pressure, thereby reducing or removing the braking force that exists within the brake joint 602.

In one example, the hydraulic actuation mechanism 620 can be positioned distally or away from the brake joint 602. For instance, it can be remotely located in a different location on a robotic assembly, such as in a central control area or other structure of a master robotic exoskeleton. This arrangement could provide the means to generate a relatively large force, while keeping the distal weight on a master arm manipulated by an operator very low.

While several examples of actuators are disclosed and discussed above, these are not intended to be limiting in any way. Indeed, it is contemplated that still other types of actuators can be arranged between the upper and lower pairs of compression disks 214a and 214b, and structurally supported and actuated to generate a braking force within a suitably configured brake joint similar to the examples discussed above with reference to FIGS. 2-6. While these are not detailed herein, those skilled in the art will recognize that such actuator types can be implemented to apply a braking force within the brake joint. Some examples are provided below.

In one example, a magnetostrictive actuator can be implemented, which changes shape when subjected to an applied magnetic field generated by a device such as a coil wound around a rod of magnetostrictive material. For instance, TERFENOL-D ($Tb_{0.3}Dy_{0.7}Fe_{1.92}$) is notable in having the highest reported strain (~$2\times10^{-3}$) of all alloys. Magnetostrictive actuators have an advantage over a piezoelectric actuator in that they can operate at relatively low voltages.

In another example, shape memory alloys (SMA) can be incorporated as an actuator, wherein the SMA changes shape upon undergoing a thermally induced phase transition between two stable phases: a high temperature phase (the Austenite phase) and a low temperature phase (the Martensite phase). A Nickel Titanium alloy NiTi alloy can be used due to its reasonable cost, non-toxicity, very large generated stresses (~200 MPa), and unloaded strain (~0.04).

In still another example, Magnetic Shape memory Alloys (MSMA) can be incorporated as an actuator, such as a Ni—Mn—Ga alloy. These provide large reversible magnetic-field-induced strain, with moderately high stress, operation frequency, and long cycle life.

In still another example, super-coiled polymers (SCP) can be incorporated as an actuator, which can be fabricated from various materials including conductive nylon sewing threads that are twisted to form coils. The length of the coils could be controlled by heating and cooling. Once properly pretreated (via repeated heating and cooling cycle) the SCP actuator can be made to contract and expand in a controlled way by controlling the current flowing (hence heat) through the twisted threads.

FIGS. 7A-7C illustrate another example of a brake joint 700 (or "brake assembly") operable to provide reflected forces to a master robotic system (e.g., one worn by or otherwise interfacing with an operator) as corresponding to a force generated at a slave robotic device or system, such as described regarding FIGS. 1A and 1B. FIG. 7A illustrates an isometric view of the brake joint 700. FIG. 7B illustrates a side elevation view of a portion of the brake joint 700 in an engaged configuration or state, with FIG. 7C illustrating a portion of the brake joint 700 in a disengaged configuration or state.

The brake joint 700 can comprise a first braking component 702a associated with a first robotic link 703a and a second braking component 702b associated with a second robotic link 703b. The first and second robotic links 703a and 703b (shown generically) can be rigid support members (e.g., aluminum, steel, composites, etc.) of a robotic assembly, such as upper and lower support members about the arm of the operator within the master robotic device (e.g., exoskeleton type robotic device) of FIG. 1A. The robotic links 703a and 703b can alternatively comprise support members in any conceivable type of robotic device, where the first and second robotic links 703a,703b are rotatable relative to one another about a joint.

As shown in FIG. 7A, the first and second robotic links 703a and 703b can be rigidly attached or coupled to, joined or integrally formed with the upper housing 705a and lower housing 705b, respectively, wherein the first and second robotic links 703a and 703b are configured and operable to rotate relative to one another about axis Y of the brake joint 700 (e.g., one or both of the first and second robotic links 703a,703b can be rotated, with the rotation being relative). The first braking component 702a can be rigidly attached to the upper housing 705a, and the second braking component 702b can be rigidly attached to the lower housing 705b. The upper and lower housings 705a and 705b can collectively form a brake joint housing that contains components of the brake joint 700, as further discussed below.

The first and second braking components 702a and 702b can comprise an interleaved multi-disk configuration, wherein these can be compressed to generate a braking force within the brake joint 700. More specifically, the first braking component 702a can comprise a set of three compression disks 708a, 708b, and 708c spatially separated from each other in a planar parallel configuration, as shown in FIGS. 7A and 7B. The second braking component 702b can comprise a pair of compression disks 710a and 710b each nested within respective gaps defined by the spatial separation of and formed between the three compression disks 708a-c. Accordingly, each of the compression disks 710a and 710b, as arranged relative to the compression disks 708a, 708b,708c, are configured and operable to rotate (about the Y-axis) within the respective parallel gaps defined by and relative to the compression disks 708a-c. In other words, the compression disks 708a-c (these being supported by and about the upper housing 705a) and the compression disks 710a-b (these being supported by and about the lower housing 705b) are rotatable relative to one another via rotatable actuation of the brake joint 700. The compression disks 708a-c and 710a-b can be comprised of any suitable material as recognized by those skilled in the art. For example, and not intending to be limiting in any way, the compression disks can be comprised of Teflon impregnated aluminum (such as provided under the trade names Tufram® or Tiodize® or Hardtuf). Other materials, such as composites (e.g., PTFE-PTFE, FEP-FEP, PFA-PFA, PTFE-PEEK) are also contemplated for use. Still other types of materials that can be used to form the compression disks will be apparent to those skilled in the art.

A support base or block 711 can be situated inside the brake joint housing, such as below the compression disks 708a-c, to provide a counter-acting biasing force against a braking force applied by an actuator (which actuator and braking force are discussed below). The support block 711 can be attached to the compression disk 708c, to the lower housing 705b, or to both of these. Similar to the example of FIGS. 2-3B, upon actuation of an actuator 718, the compression disks 708a-c can be caused to "pinch" or compress the compression disks 710a and 710b, which thereby generates and applies a braking force within the brake joint 700 as it moves (e.g., see FIG. 7C) (e.g., the braking force being applied in response to a force generated at a slave robotic device, such that a corresponding reflected force (e.g., one proportional to the force generated at the slave robotic device), is caused to be generated in a master robotic device to be felt by the operator). Conversely, the compression disks can be operated to reduce/release the braking force (see FIG. 7B) based on the forces reflected from the slave robotic device. As is discussed above, an applied braking force within the brake joint 700 can cause the rotation between the first robotic link 703a relative to the second robotic link 703b to be constrained or resisted (or completely locked), thus transferring such forces to the operator in order for the operator to be able to experience such forces.

In one example, the actuator 718 can comprise an electric motor 720 attached to or otherwise supported within the brake joint housing. In one aspect, the electric motor 720 can be supported about (e.g., coupled to) the upper housing 705a. In another aspect, the motor 720 can be supported about (e.g., coupled to) the compression disk 708a. The motor 720 can be configured and operable to rotate an actuator shaft 724 in a bi-directional manner to generate and reduce/remove the braking force within the brake joint 700. The bi-directional movement can be applied with the brake joint rotating in any direction. As such, the actuator 718 can be in communication with the one or more signal processors or a computer operable to process signals, which correspond to and which are based on the force or forces generated within the slave robotic device, wherein the motor 720 receives operation commands. The motor can be operable with a transmission component in some examples. In another example, an elastic element, such as a spring, can be coupled to the actuator shaft 724 in a manner that rotatably biases the actuator shaft 724 in a clock-wise direction (i.e., an "off" position), so that when the electric motor 720 releases or removes an actuation force, the elastic element automatically biases or moves the actuator shaft 724 accordingly.

The actuator can further comprise a cam member 726 fixedly attached to the actuator shaft 724. The cam member 726 can comprise a cam having an eccentric configuration operable to convert rotational motion in the cam member 726 to translation motion within the first and second braking components 702a and 702b, which assists to generate a variably controlled braking force upon rotation, Indeed, rotation of the actuator shaft 724 in a first direction (e.g., in the clockwise direction as shown in FIG. 7C) causes the cam member 726 to rotate to facilitate translation of the compression disk 708a in a direction so as to exert a force that causes the compression disks 708a-c to engage the compressed disks 710a and 710b, which thereby generates a braking force upon rotation within the brake joint 700, the braking force being a result of the friction forces generated between the compression disks, as illustrated in FIG. 7C.

Conversely, as illustrated in FIG. 7B, rotating the actuator shaft 724 in the opposite direction (e.g., in the counterclockwise direction) causes the cam member to 726 to rotate to facilitate translation of the compression disk 708a in a direction so as to reduce (or remove) the braking force (depending on the amount of controlled rotational movement of the cam member 726).

In one example, the cam member 726 can be positioned so as to contact the compression disk 708a at or near the rotational axis Y of the brake joint 700. That is, such contact location is closer to rotational axis Y than outer perimeter portions of the first and second braking components 702a and 702b. One advantage of this positioning configuration is the elimination of the need for kinematic mapping of a non-anthropomorphic kinematic arrangement onto a human kinematic configuration. In other examples, such as in the case of brake joints associated with hands of a operator, the brake joints can be located on the tops of the digits/fingers due to the limited space between fingers.

The motor 720 can be communicatively coupled (wirelessly or directly wired) to a controller 721 of a computer system, such as that operable with a master robotic system. Thus, the rotational direction, torque, and velocity of the actuator shaft 724 can be controlled to facilitate a particular braking force that corresponds to a reflection force of a corresponding slave joint, as discussed herein. Moreover, by controlling the properties of rotation of the cam member 726 via a controller, the brake joint 700 can be dynamically controlled to generate a dynamic braking force, such as when a reflection force of a slave joint dynamically changes, or as needed or desired.

It is noted herein that any of the actuators described above with respect to FIGS. 4-6 can be incorporated within the arrangement of the housing and compression disks of FIGS. 7A-7C. For instance, a piezoelectric actuator could have a support base attached to the compression disk 708a (or upper housing 705a), like the position of the motor of FIG. 7A. Such piezoelectric actuator could have a single actuation member that downwardly biases the compression disk 708a to generate a variably controlled braking force, similar to the operation and position of the cam member 726.

The brake joint actuators discussed herein can have maximum strain of approximately $10^{-5}$ to $10^{-1}$ (with the exception of the polymer actuator), which is much smaller than the strain of traditional force-reflection actuation techniques (e.g., hydraulic actuators, servo-pneumatic actuators, etc.). For example, pneumatic and hydraulic actuators can have a maximum actuation strain of about $10^{-1}$ to $10^{-0}$. As an example of the maximum strain achieved in the present disclosure, the piezoelectric actuators discussed herein can have a maximum strain of $10^{-5}$ to $10^{-1}$, or approximately 0.1% (or 1,000 micro-strain). Thus, because of the aforementioned mechanical amplification advantages of incorporating piezoelectric actuators with the example brake joint actuators herein, the maximum strain could be only about 1 mm. This is because of the arrangement of the piezoelectric actuator being adjacent opposing disks, and the arrangement of the upper and lower disks being frictionally engaged to each other, so that a relatively small actuation force (e.g., resulting from the 1 mm of strain), can cause the disks to compress.

And, the brake joint actuators discussed herein can have very high operation frequency. For instance, piezoelectric and magnetostrictive actuators can operate in the range of 0 to 100 kHz and even higher for certain applications, while others have very high maximum stress (e.g., for shape memory alloys and magnetostrictive actuators, this can be approximately 90 to 700 MPa). Such operating frequency range and stress range is relatively greater than the maximum operating frequency and stress values of traditional force-reflection actuation techniques. For example, traditional pneumatic actuators can operate at a maximum operation frequency of 50 to 300 Hz, and a maximum stress of 0.5-0.9 MPa (while hydraulic actuators operate at maximum stress of 20-70 MPa.

Other examples of brake joint actuators that could be incorporated into a force-reflection input brake joint include a: piezoelectric polymer device; thermal expansion device; magnetostrictor device; shape memory alloy device; moving coil transducer; solenoid device; ball ramp device; electromagnetic actuator; off-set cam actuator; and pneumatic device. For instance, one or more of the plates may be comprised of a ferromagnetic material, and an electromagnetic actuator may be coupled adjacent the plates, so that upon application of an electric field to the electromagnetic actuator, an electric field causes the ferromagnetic plates to move and compress adjacent plates, thereby generating a braking force.

Figure 8:
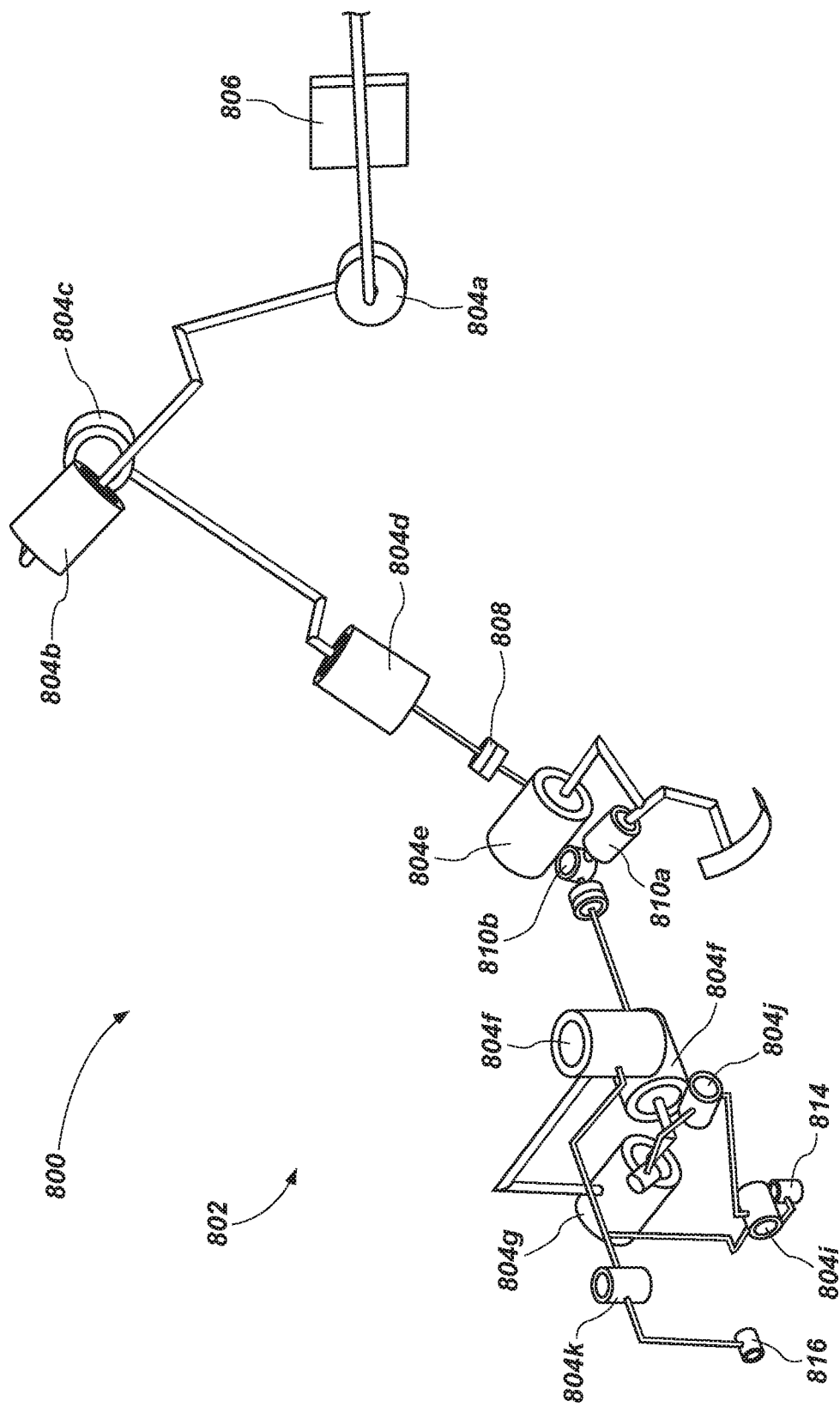
FIG. 8 schematically illustrates a system of a coordinated master robotic system having at least one master brake joint in accordance with an example of the present disclosure.

FIG. 8 illustrates a robotic system 802 having a plurality of force-reflection input brake joints 804a-k. It is noted that any number of the brake joints illustrated can be comprised of any one of the exemplary types of brake joints discussed herein. Indeed, the robotic system 802 can comprise the same or different types of brake joints. FIG. 8 shows a robotic system 802 having one or more degrees of freedom that correspond to one or more of the degrees of freedom of the arm, wrist and fingers of an operator. In one aspect, the robotic system 802 can be representative of a right arm portion of an exoskeleton master robotic device wearable by a human operator on the right arm/shoulder (such as shown in FIG. 1A). In another aspect, it can be representative of an operator controlled robotic device as part of a teleoperated robotic system. In still another aspect, it can be representative of a portion of a humanoid robot.

Within the robotic system 802, a fixed base 806 can be coupled to a support structure, such as a backpack control module worn by an operator (e.g., as in the exoskeleton example of FIG. 1A). A scapula brake joint 804a can be rotatably coupled to the fixed base 806 and can have a given range of motion (e.g., a range of motion up to 120 degrees). A flexion/extension brake joint 804b can be rotatably coupled to the scapula brake joint 804a and can have a given range of motion (e.g., a range of motion up to 210 degrees). An abduction/adduction brake joint 804c can be rotatably coupled to the flexion/extension brake joint 804b and can have a given range of motion (e.g., a range of motion up to 180 degrees). A humeral rotation brake joint 804d can be rotatably coupled to the abduction/adduction brake joint 804c and can have a given range of motion (e.g., a range of motion up to 180 degrees). An upper length adjust 808 can be operable with the humeral rotation brake joint 804d for adjusting a length of the right arm robotic assembly (e.g., providing up to 3 inches in adjustment length). An elbow brake joint 804e can be rotatably coupled to the humeral rotation brake joint 804d and can have a given range of motion (e.g., a range of motion up to 135 degrees). A first lower passive joint 810a can be rotatably coupled to the elbow brake joint 804e and to an operator forearm interface 812, and a second lower passive joint 810b can be rotatably coupled to the first lower passive joint 810a. A wrist rotation brake joint 804f can be rotatably coupled to the second lower passive joint 810b and can have a given range of motion (e.g., a range of motion up to 180 degrees). A wrist abduction/adduction brake joint 804g can be rotatably coupled to the wrist rotation brake joint 804f and can have a given range of motion (e.g., a range of motion up to 90 degrees). A wrist flexion/extension brake joint 804h can be rotatably coupled to the wrist abduction/adduction brake joint 804g and can have a given range of motion (e.g., a range of motion up to 135 degrees). A thumb deploy brake joint 804i can be rotatably coupled to the wrist flexion/extension brake joint 804h and can have a range of motion (e.g., a range of motion up to 38 degrees). A thumb brake joint 804j can be rotatably coupled to the thumb deploy brake joint 804i and can have a given range of motion (e.g., a range of motion up to 60 degrees). Both thumb joints may or may not comprise brake joints or be associated with braking components. A thumb ring 814 can be coupled to the thumb brake joint 804j and can be configured to be operable with a thumb. A finger brake joint 804k can be rotatably coupled to the wrist flexion/extension brake joint 804h and can have a given range of motion (e.g., a range of motion up to 90 degrees). A finger ring 816 can be coupled to the finger brake joint 804k and can be configured to be operable with a finger. Each of the brake joints 804a-k can be moveable in all degrees or some degrees of freedom.

The wrist and finger joints could be embodied within the "Hand Control Device for Controlling a Peripheral System" of U.S. patent application Ser. No. 13/665,697 filed on Oct. 21, 2012, which is incorporated by reference herein. That is, such Hand Control Device can be incorporated for use with the exoskeleton of FIG. 1A and with any of the brake joints discussed herein.

The master brake joints discussed herein can further comprise a vibration generator used to provide tactile feedback to the operator, such as when contact is made with an object (torque transient+vibration) by a slave robotic system. In some examples, vibration generators associated with or coupled to each master brake joint of the hand can provide realistic mimicking of the slave robot impacting an object, grabbing an object, etc., because the vibration generators can cause the operator to feel a variable vibration sensation depending on the event experienced by the slave robot. For instance, if slave robotic fingers or gripper are sliding along an object, such as a wall, a corresponding vibratory stimulus would be felt by the hand of operator wearing the master robotic system. This can be used as effectively a tactile indication to the operator that the operator may be exerting too much force to an object (e.g., greater than the maximum force exertable by the slave robot hand/gripper), or to indicated that an object is slipping out of the slave robot's hand/gripper.

Note that in some examples, the present disclosure provides kinematic equivalence to the operator of the master robotic system or interface, and kinematic equivalence of the master robotic system or interface and the slave robotic system. In some examples, the master robotic system and the slave robotic system may both be associated with only a hand, an arm, an arm and hand, an arm and torso, an arm/hand/torso, a leg, legs, legs and a torso, legs/arms/torso, legs and arms, and a torso and hands, or any combination thereof.

FIG. 9 illustrates a graphical representation of an exemplary control system of a master robotic system 900 (including a mastering device, e.g., as in FIG. 1A) in control of a slave robotic system 902 (including a slave robotic device, e.g., as in FIG. 1B). In one aspect, as further discussed above, the master robotic system 900 can comprise one or more master brake joints, such as master brake joints 904a and 904b. Each brake joint can be configured as discussed herein, and can comprise the various components or elements discussed herein, such as braking components and an actuator. The brake joints can further comprise one or more position sensors and/or one or more force/load sensors. The master robotic system 900 can comprise a master computer 906 having a general purpose central processing unit (CPU). Alternatively, a field programmable gate array (FPGA), application specific integrated circuit (ASIC) or other type of processor may be used. The master computer 906 can communicate with the actuator, position sensor, and force sensor of each master brake joint 904a and 904b using wired or wireless technologies or means.

The slave robotic system 902 can comprise one or more slave joints, such as slave joints 908a and 908b that correspond to respective master-joints 904a and 904b (as illustrated by the dashed lines). Each slave joint 908a and 908b can comprise an actuator, a position sensor, and a force/load sensor, as illustrated. The slave robotic system 902 can comprise a slave computer 910 comprising a general purpose central processing unit (CPU). Alternatively, a field programmable gate array (FPGA), application specific integrated circuit (ASIC) or other type of processor may be used. The slave computer 910 can communicate with the actuator, position sensor, and force sensor of each slave joint 908a and 908b using wired or wireless technologies or means. The slave robotic system 902 can have some or all of the features discussed regarding the slave robot of U.S. patent application Ser. No. 13/332,165 filed Dec. 20, 2011, which is incorporated by reference in its entirety herein.

Alternatively, a slave computer may not be needed in an example where each slave joint directly communicates with the master computer 906. For instance, the position and force sensors of each slave joint 908a and 908b can transmit signals (via wireless transmitters) directly to the master computer 906 for processing data associated with respective slave joints 908a and 908b. In another example, the position and force sensors of each slave joint 908a and 908b are communicatively coupled to an external or remote computer that receives and transmits data to the master computer 906.

As introduced above, the master robotic system 900 can sense (via position and/or load sensors) an applied load from the user/operator within the various DOFs of the master robotic system, and can then transmit corresponding data associated with such applied loads to the slave robotic system 902 for controlling movement of the slave robotic system 902 (e.g., one or more slave arms) as corresponding to the movement of the master robotic system 900. As used herein, a "load" can include a force and/or a moment Thus, a load sensor can sense a force and/or a moment. The load sensor can be configured to sense loads in multiple DOFs of a particular joint (master and/or slave), and to facilitate output of a load value. A load sensor is capable of detecting linear and/or rotational loads acting on a slave robotic arm, for instance. For example, a multi-axis load sensor, such as a six DOF load sensor, can measure three force components along x, y, and z axes of the sensor as well as three moment components acting about the axes. Thus, a load sensor associated with a slave joint can detect whether the slave arm is in forceful contact with an obstacle, or is experiencing a force due to lifting an object. If so, the slave computer can be configured to transmit force reflection data (e.g., a control signal) associated with the slave joint to the master computer (or to a central control system). Accordingly, the master computer can be configured to transmit the force reflection data to an actuator of a master brake joint as braking force data corresponding to forces experienced by the slave joint (e.g., a master elbow joint corresponds to a slave elbow joint). The braking force data can be transmitted as a particular applied voltage (e.g., to an electric actuator) to control an amount of generated braking force to the brake joint, which can be proportional to the force experienced by the slave joint (see the "lifting" example of FIGS. 1A and 1B).

The load sensors can include any type of suitable load sensor including, but not limited to, a strain gauge, a thin film sensor, a piezoelectric sensor, a resistive load sensor, and the like. For example, load sensors that may be used include load cells produced by Sensotec, P/N AL311CR or P/N AL31DR-1A-2U-6E-15C, Futek, P/N LCM375-FSSH00675, or P/N LCM325-FSH00672.

In one aspect, there is one position sensor for each DOF associated with each master brake joint 904a and 904b and each DOF of slave joints 908a and 908b, as illustrated in FIG. 9. Each position sensor can be located at or proximate each of the joints and can be configured to measure angular position. In one aspect, position sensors can detect a change in position of various joints and support members of the master robotic system 900, and facilitate output of a position value. This change in position can be used to cause a proportional change in position of the corresponding DOF of the slave robotic system 902. The position sensor can be an absolute position sensor that enables the absolute position of each joint (master or slave) to be determined at any time. Alternatively, the position sensor may be a relative position sensor. The position sensors can include any type of suitable position sensor for measuring a rotation of each joint, including but not limited to an encoder, a rotary potentiometer, and other types of rotary position sensors. One example of a position sensor that can be used is an encoder disk produced by Gurley Precision Instrument, Manufacturer Model No. P/N AX09178. Such encoder disk can be coupled to each joint of the master and slave robotic assemblies. An encoder reader produced by Gurley Precision Instrument, Model No. P/N 7700A01024R12U0130N, can be used to read the encoder disk to provide an absolute position reading at each joint.

The master robotic system 900 can include a general DOF controller (GDC) (not shown) associated with each DOF of each master brake joint. In one example, a separate GDC can be operable with each master brake joint. The GDC can be in communication with sensors, such as the load sensor and position sensor, located at each brake joint, which sensors can be included anywhere in the brake joint, including at the braking interface. The GDC can also be in communication with the actuator at each master brake joint. Each GDC can be used to monitor and adjust the position and torque at a selected brake joint. Information can also be received at the GDC regarding the position, torque, and force reflection of the associated or corresponding slave joint. The information regarding a torque measurement at each slave joint can be communicated to the GDC for the associated or corresponding master brake joint. The GDC can then output a command (or voltage) to the actuator to generate a braking force to provide force feedback regarding the interaction of the slave robotic system with its environment and/or with a load that is lifted by the slave robotic system.

In one example, the GDC for each DOF on the master robotic system 900 can be a computer card containing one or more microprocessors configured to communicate with the desired sensors to perform calculations used to control the movements of the slave robotic system 902 about corresponding slave joints. For instance, a GDC can include a general purpose central processing unit (CPU). Alternatively, a field programmable gate array (FPGA), application specific integrated circuit (ASIC) or other type of processor may be used. The GDC can communicate with the sensors using wired or wireless technologies or means. Any GDC may be disposed within a housing of any particular joint.

The slave robotic system 902 can also include a GDC associated with each DOF of the slave joints. In one example, separate GDCs can be operable about each of the DOF in the slave robotic system 902. The GDCs of the slave robotic system 902 can be similar to, and serve the same purpose as, the GDCs of the master robotic system 900.

With continued reference to FIG. 9, each actuator of the slave joints 908*a* and 908*b* can have a corresponding position sensor and/or load sensor that can determine both the position and/or force (or torque) acting on the slave joints, each of which can comprise a DOF. Each GDC of the slave robotic system 902 can use the inputs from a position sensor and a load sensor associated with each slave joint 908*a* and 908*b*, for example, to calculate a force that can be converted into a signal, transmitted to the master robotic system 900, to actuate the actuator of a corresponding brake joint with a specified braking force to apply a specified torque at an associated DOF. An accelerometer or other velocity sensing device may also be associated with each slave joint (and/or master joint) to measure and transmit velocity data.

For each degree a user moves a master brake joint in the master control arm, the master position command can be set to provide a corresponding movement in the slave arm with a desired ratio. A typical ratio may be 1:1, enabling the slave arm to move at the same rate as the master control arm. However, a ratio of 2:1, 3:1, or higher may be selected to enable a user to make relatively small movements at the master arm while commanding the slave arm to move 2 to 3 times further. This may be helpful to the user when performing repeated movements by limiting the amount of movement of the user to reduce user fatigue. Conversely, the ratio may be set to 1:2, 1:3, or lower when the user is performing delicate tasks. By reducing the ratio, and requiring the user to move further than the corresponding movements of the slave arm, it enables the user to have more fine motor control over delicate tasks. The actual ratio can be set by adjusting the master position command based on the needs and uses of the system and the system operator.

As discussed above, a slave robotic system can be a non-humanoid robot, a humanoid robot, a hand robot, a virtual robot, a virtual avatar robot, etc., while a master control system, having brake joint(s), can be an exoskeleton robotic assembly, non-humanoid robot, a humanoid robot, a virtual reality controlled system, etc. Thus, the master brake joint configuration discussed herein has broad industrial, military, logistical, first responder, consumer and other applications.

For example, an operator wearing a VR headset and an upper exoskeleton, for instance, can feel what their virtual robot feels in real-time via a plurality of brake joints within the exoskeleton. This can type of virtual platform control can be useful for a variety of purposes, such as training, gameplay, exercise/cardo, weightlifting, and others when operators are restricted from particular movements displayed in the virtual platform. For instance, a bodybuilder can do curls typically performed with dumbbells without having to own/use any dumbbells because the brake joints of an exoskeleton worn by the bodybuilder can provide coordinated and proportional force reflection to the bodybuilder while performing the curls.

The described brake joints described herein could be an important addition for combat training in simulated environments. For instance, VR simulated environments, such as Virtual Battlespace 2 (VBS2), allow combat teams to rapidly, and cost effectively, plan, rehearse, train and conduct after action reviews of complex missions that requires coordinated actions involving multiple assets, such as armored vehicles, UAVs, rotorcrafts, and dismounted soldiers. In fact, multiple soldiers on foot can be physically immersed in such virtual world, where they can conduct simulated missions, in urban environments, jungles, and other complex terrain.

Figure 10:
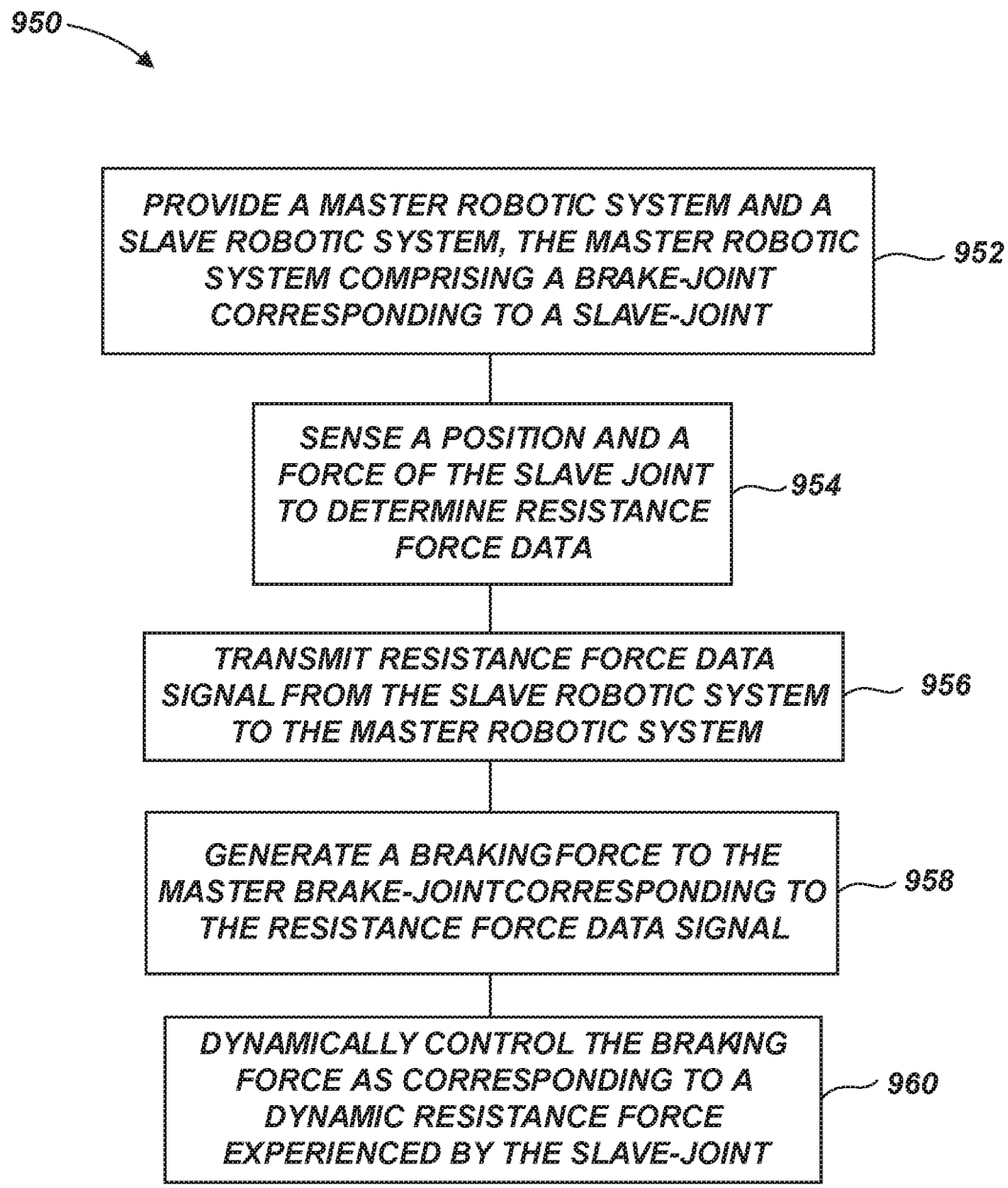
FIG. 10 illustrates a graphical representation of a method for translating a resistance force of a slave robotic system to a master robotic system in accordance with an example of the present disclosure.

FIG. 10 illustrates a method 950 of translating a force of a slave robotic system to a master robotic system, such as described with reference to the systems of FIGS. 1A-9. Operation 952 comprises providing a master robotic system and a slave robotic system, where the master robotic system comprises a master brake joint corresponding to a slave joint of the slave robotic system (e.g., FIGS. 1A and 1B). Operation 954 comprises sensing a position and/or a force of the slave joint to determine force data, as further described regarding FIG. 9. Operation 956 comprises transmitting the force data signal (e.g., a control signal) from the slave robotic system to the master robotic system as further described regarding FIG. 9. Operation 956 comprises generating a braking force within the master brake joint corresponding to the force data signal, as further described regarding FIGS. 1A-9. Operation 960 comprises dynamically controlling the braking force, such in response to a changing force experienced by the slave joint, or as needed or desired. For instance, the electrical input applied to an actuator (of FIGS. 2-9) can be varied, thereby varying the braking force within the brake joint.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A force-reflective master robotic brake joint assembly for translating a force at a slave robotic system to a master robotic system, comprising:
   a first braking component associated with a first robotic link of a master robotic system, the first braking component comprising a pair of upper compression disks and a pair of lower compression disks;
   a second braking component associated with a second robotic link of the master robotic system, the second braking component comprising an upper compression disk disposed between the pair of upper compression disks and a lower compression disk disposed between the pair of lower compression disks, wherein the second braking component is configured to rotate relative to the first braking component; and
   an actuator disposed between the pair of upper compression disks and the pair of lower compression disks and configured to act upon the first braking component and the second braking component to generate a braking force between the first braking component and the second braking component in response to a control signal corresponding to a force sensed by a slave robotic system.

2. The force-reflective master robotic brake joint assembly of claim 1, wherein the braking force is variable.

3. The force-reflective master robotic brake joint assembly of claim 1, wherein the braking force is non-variable.

4. The force-reflective master robotic brake joint assembly of claim 1, wherein a magnitude of the braking force is variable, and a proportionality of the braking force to the sensed force is dynamically controllable.

5. The force-reflective master robotic brake joint assembly of claim 1, wherein the actuator comprises a bi-directional actuator having a actuator and an actuation member, wherein the actuator is configured to rotate the actuation member to apply a bi-directional force to at least one of the first braking component or the second braking component to generate the braking force.

6. The force-reflective master robotic brake joint assembly of claim 5, wherein the actuation member comprises a rigid body having oppositely extending arms, a first roller rotatably coupled to one of the arms, and a second roller rotatably coupled to the other of the arms, the rollers being configured to reduce friction between the actuation member and the first braking component and the second braking component.

7. The force-reflective master robotic brake joint assembly of claim 1, wherein the actuator comprises a dielectric actuator configured to generate the braking force, wherein the dielectric actuator comprises a dielectric material disposed between a pair of electrodes coupled to a voltage source.

8. The force-reflective master robotic brake joint assembly of claim 1, wherein the actuator comprises a piezoelectric actuator configured to generate the braking force, wherein the piezoelectric actuator comprises a stack of piezoelectric components configured to be coupled to a voltage source configured to displace the stack of piezoelectric components.

9. The force-reflective master robotic brake joint assembly of claim 1, wherein the actuator comprises a fluid actuator configured to generate the braking force, wherein the fluid actuator comprises a fluid actuation component and at least one piston fluidly coupled to the fluid actuation component, wherein the fluid actuation component is positioned distally from the at least one piston and is configured to actuate the at least one piston to generate the braking force.

10. The force-reflective master robotic brake joint assembly of claim 1, wherein the first braking component and the second braking component comprise an interleaved multi-disk configuration compressible to generate the braking force.

11. The force-reflective master robotic brake joint assembly of claim 1, wherein the actuator comprises a first biasing component and an opposing second biasing component, the first biasing component selectively biasing an inner disk of the pair of upper compression disks and the second biasing component selectively biasing an opposing inner disk of the pair of lower compression disks.

12. The force-reflective master robotic brake joint assembly of claim 1, wherein the actuator is attached to a support portion of the first braking component between the pairs of upper and lower compression disks.

13. The force-reflective master robotic brake joint assembly of claim 1, wherein the actuator is positioned between the pairs of upper and lower compression disks.

14. The force-reflective master robotic brake joint assembly of claim 1, wherein the actuator comprises a cam member fixedly attached to an actuator shaft, the cam member comprising a cam having an eccentric configuration configured to convert rotational motion in the cam member to translation motion within the first braking component and the second braking component, thereby compressing the first braking component and the second braking component together.

15. The force-reflective master robotic brake joint assembly of claim 1, further comprising a processor facilitating processing of the control signal.

16. A force-reflective robotic system for translating a force of a slave robotic system to a master robotic system, comprising:
   a slave robotic system comprising a plurality of slave joints; and
   a master robotic system having a plurality of master brake joints, each corresponding to a respective one of the slave joints controllable by the master robotic system, wherein each master brake joint comprises a first braking component comprising an upper pair of compression disks and a lower pair of lower compression disks, and a second braking component comprising an upper compression disk situated between the upper pair of compression disks, and a lower compression disk situated between the lower pair of compression disks, the compression disks of the first braking component being rotatable relative to the disks of the second braking component, and an actuator disposed between the upper and lower pairs of compression disks of the first braking component, and configured to act on these to compress each of the upper and lower compression disks of the second braking component to generate a braking force in response to a control signal corresponding to a force sensed by the slave robotic system.

17. The force-reflective robotic system of claim 16, wherein the master robotic system comprises one of a humanoid robotic assembly, an exoskeleton robotic assembly, and a human-operated robotic assembly.

18. The force-reflective robotic system of claim 16, wherein the master robotic system comprises at least one of an upper body exoskeleton and a lower body exoskeleton, each comprising a plurality of exoskeleton links rotatably coupled together by one of the master brake joints.

19. The force-reflective robotic system of claim 16, wherein the master robotic system comprises a controller configured to control each of the master brake joints, the controller comprising a computer configured to dynamically control the braking force associated with each master brake joint.

20. The force-reflective robotic system of claim 16, wherein each slave joint comprises one or more sensors configured to provide position data, velocity data, force data or both position and force data associated with the slave joint.

21. The force-reflective robotic system of claim 16, wherein the actuator is dynamically controllable by the master robotic system and comprises a bi-directional actuator, a dielectric actuator, a piezoelectric actuator, a cam actuator, a ball ramp actuator, an electromagnetic actuator, a pneumatic actuator, or a hydraulic actuator.

22. The force-reflective robotic system of claim 16, wherein the multiple disks are configured to rotate relative to one another about an axis of rotation of the respective master brake joint.

23. A method of translating a force of a slave robotic system to a master robotic system, wherein the master robotic system comprises a master brake joint corresponding to a slave joint of the slave robotic system, the method comprising:
   transmitting a force data signal from the slave robotic system to the master robotic system; and
   generating a braking force within the master brake joint corresponding to the force data signal,
   wherein the master brake joint comprises a first braking component, a second braking component, and an actuator, the first braking component comprising a pair of upper compression disks and a pair of lower compression disks, the second braking component comprising an upper compression disk situated between the pair of upper compression disks, and a lower compression disk situated between the pair of lower compression disks, the disks of the first braking component being rotatable relative to the disks of the second braking component, and
   wherein the actuator is disposed between the pair of upper and lower compression disks of the first braking component, and configured to generate the braking force by compressing each of the upper and lower compression disks of the second braking component.

24. The method of claim 23, further comprising dynamically controlling the braking force to provide varying magnitudes of braking force.

25. The method of claim 24, wherein generating the braking force comprises controlling the actuator of the master brake joint to generate the braking force.

26. The method of claim 25, further comprises sensing one or both of a position and a force of the slave joint to obtain force data to be transmitted to the master robotic system.

27. The method of claim 25, further comprises sensing one or both of a position and a force of the master brake joint.

28. The method of claim 26, further comprising receiving the transmitted force data at the master robotic system via a computer system, wherein the force data is processed and a corresponding braking force generated within the master robotic system.

29. A master robotic system for translating a force at a slave robotic system to the master robotic system, comprising:
   a plurality of robotic links; and
   a plurality of master brake joints rotatably coupling the plurality of robotic links, each master brake joint corresponding to a respective slave joint of a slave robotic system controllable by the master robotic system, wherein each master brake joint comprises:
      a first braking component coupled to a first robotic link of the plurality of robotic links, the first braking component comprising a pair of upper compression disks and a pair of lower compression disks;
      a second braking component, the second braking component comprising an upper compression disk disposed between the pair of upper compression disks and a lower compression disk disposed between the pair of lower compression disks coupled to a second robotic link of the plurality of robotic links, wherein the second braking component is configured to rotate relative to the first braking component; and
      an actuator disposed between the pair of upper compression disks and the pair of lower compression disks and configured to act upon the first braking component and the second braking component, to generate a braking force between the first braking component and the second braking component, in response to a control signal corresponding to a force sensed by the slave robotic system.

30. The master robotic system of claim 29, wherein the braking force is variable.

31. The master robotic system of claim 29, wherein the braking force has only a first magnitude.

32. The master robotic system of claim 29, wherein a magnitude of the braking force is variable, and a proportionality of the braking force to the sensed force is dynamically controllable.

33. The master robotic system of claim 29, wherein the actuator comprises a bi-directional actuator having a motor and an actuation member, wherein the motor is configured to rotate the actuation member to apply a bi-directional force to at least one of the first braking component or the second braking component to generate the braking force.

34. The master robotic system of claim 29, wherein the actuator comprises at least one of:
   a dielectric actuator configured to generate the braking force, wherein the dielectric actuator comprises a dielectric material disposed between a pair of electrodes coupled to a voltage source;
   a piezoelectric actuator configured to generate the braking force, wherein the piezoelectric actuator comprises a stack of piezoelectric components configured to be coupled to a voltage source configured to displace the stack of piezoelectric components; or a hydraulic actuator configured to generate the braking force, wherein the hydraulic actuator comprises a hydraulic actuation component and at least one hydraulic piston fluidly coupled to the hydraulic actuation component, wherein the hydraulic actuation component is positioned distally from the at least one hydraulic piston and is configured to actuate the at least one hydraulic piston to generate the braking force.

35. The master robotic system of claim 29, wherein the first braking component comprises a pair of upper compression disks and a pair of lower compression disks, and wherein the second braking component comprises an upper compression disk situated between the pair of upper compression disks, and a lower compression disk situated between the pair of lower compression disks, the disks of the first braking component being configured to rotate relative to the disks of the second braking component, and wherein the actuator is disposed between the pairs of upper and lower compression disks of the first braking component, and configured to act on these to compress each of the upper and lower compression disks of the second braking component to generate the braking force.

36. The master robotic system of claim 35, wherein the actuator comprises a first biasing component and an opposing second biasing component, the first biasing component selectively biasing an inner disk of the pair of upper compression disks and the second biasing component selectively biasing an opposing inner disk of the pair of lower compression disks.

37. The master robotic system of claim 29, wherein the actuator comprises a cam member fixedly attached to an actuator shaft, the cam member comprising a cam having an eccentric configuration configured to convert rotational motion in the cam member to translation motion within the first braking component and the second braking component, thereby compressing the first braking component and the second braking component together.

38. The master robotic system of claim 29, wherein the master robotic system comprises one of a humanoid robotic assembly, an exoskeleton robotic assembly, and a human-operated robotic assembly.

39. The master robotic system of claim 29, wherein the master robotic system comprises a controller configured to control each of the master brake joints, the controller comprising a computer configured to dynamically control the braking force associated with each master brake joint.

40. The master robotic system of claim 29, wherein the master robotic system is associated with at least one of: a hand; an arm; an arm and hand; an arm and torso; an arm and a hand and a torso; a leg; legs; legs and a torso; legs and arms and a torso; legs and arms; or a torso and hands; or any combination thereof.

* * * * *